United States Patent [19]

Glew et al.

[11] Patent Number: 5,751,996

[45] Date of Patent: May 12, 1998

[54] METHOD AND APPARATUS FOR PROCESSING MEMORY-TYPE INFORMATION WITHIN A MICROPROCESSOR

[75] Inventors: Andrew F. Glew, Hillsboro; Glenn J. Hinton, Portland, both of Oreg.

[73] Assignee: Intel Corporation, Santa Clara, Calif.

[21] Appl. No.: 767,799

[22] Filed: Dec. 17, 1996

Related U.S. Application Data

[63] Continuation of Ser. No. 316,550, Sep. 30, 1994, abandoned.

[51] Int. Cl.$^6$ .................................................. G06F 12/08
[52] U.S. Cl. .................................................. 711/145
[58] Field of Search .................................. 395/445, 446, 395/448, 449, 450, 452, 453, 465, 466, 469, 470, 472

[56] References Cited

U.S. PATENT DOCUMENTS

| | | | |
|---|---|---|---|
| 5,185,878 | 2/1993 | Baror et al. | 395/450 |
| 5,297,270 | 3/1994 | Olson | 395/403 |
| 5,325,504 | 6/1994 | Tipley et al. | 395/455 |
| 5,353,431 | 10/1994 | Doyle et al. | 395/416 |
| 5,386,547 | 1/1995 | Jouppi | 395/449 |

OTHER PUBLICATIONS

Handy, "The Cache Memory Book", 1993, pp. 75–77, 85–86, 262–263.
"Superscalar Microprocessor Design", by Mike Johnson, Prentice–Hall, Inc., 1991.
"The Metaflow Architecture", pp. 10–13 and 63–73, by Val Popescu, Merle Schultz, John Spracklen, Gary Gibson, Bruce Lightner, and David Isaman, IEEE Micro, 1991.

Jouppi, Norman P., "Some Thoughts on Memory System Research", NSF Memory System Workshop, University of Virginia, Apr. 12–13, 1993, pp. 1–3.

*Primary Examiner*—Eddie P. Chan
*Assistant Examiner*—Kevin L. Ellis
*Attorney, Agent, or Firm*—Blakely, Sokoloff, Taylor & Zafman

[57] ABSTRACT

A memory-type value identifying the type of memory contained with a range of memory locations is explicitly stored within a microprocessor. Prior to processing a memory micro-instruction such as a load or store, the memory-type is determined for the memory location identified by the memory micro-instruction. Once the memory-type is known the memory micro-instruction is processed in accordance with any one of a number of processing protocols including write-through processing, write-back processing, write-protect processing, restricted-cacheability processing, uncacheable speculatable write-combining processing, or uncacheable processing. By providing memory-type information explicitly within the microprocessor, the type of memory identified by a micro-instruction is known before the micro-instruction is processed. Accordingly, the protocol by which the micro-instruction is processed may be efficiently tailored to the memory-type. For example, if the memory location identified by the micro-instruction is known to be uncacheable, a data cache unit is bypassed and external memory is accessed directly. In an exemplary embodiment, the microprocessor is an out-of-order microprocessor capable of generating speculative memory micro-instruction. Also, the microprocessor may be only one of a number of microprocessors within a multiprocessor system.

52 Claims, 16 Drawing Sheets

FIG. 15

| Linear Address 172 | Physical Address 174 | Memory Type 176 |

170

METHOD AND APPARATUS FOR PROCESSING MEMORY-TYPE INFORMATION WITHIN A MICROPROCESSOR

This is a continuation of application Ser. No. 08/316,550, filed Sep. 30, 1994, now abandoned.

BACKGROUND OF THE INVENTION

1. Field of the Invention

The invention generally relates to computer systems having one or more microprocessors which may be capable of speculative and out-of-order processing of instructions and in particular relates to the processing of memory instructions within such microprocessors, wherein the actual processing required depends on the memory address involved.

2. Description of Related Art

State of the art multiprocessor computer systems typically employ a data cache unit (DCU) within each microprocessor for caching data from external memory to expedite satisfying load and store operations. The DCU stores data or instructions and corresponding physical addresses for many of the most recently accessed portions of the external memory. In this manner, a core execution unit of each microprocessor need not necessarily wait until data or instructions are retrieved from external memory. Data is stored within the DCU in cache-line units each containing, for example, thirty-two-bytes of data. To retrieve a unit of data from memory, a "read-for-ownership" operation is performed wherein an entire cache line containing the data is retrieved and stored in the DCU. Thereafter, the requested unit of data, as well as other data units within the same cache line, may be conveniently accessed directly from the DCU. With a read-for-ownership, the memory location containing the data is marked as being owned by the processor performing the read-for-ownership. In other implementations, a cache line may be read into the DCU without preventing other processors from accessing the same data from external memory. In either implementation, if any of the units of data within the cache line are modified, the cache line is ultimately written to the external memory, typically by burst-mode output wherein a base address of the data within the cache line is transmitted followed by a specific sequence of data units. Burst mode output provides a very efficient method for transmitting all data units within a single cache line. Burst mode may also be employed during the read-for-ownership to transmit the data into the DCU.

A number of different cache protocols have been developed for processing cache data. In a "write-through" protocol, any data units that are modified within the DCU are also immediately transmitted to the external memory using a partial write, wherein only the modified data unit is transmitted. An example of a microprocessor employing a write-through DCU is the Intel 80486 family of microprocessors. Write-through cacheability has the advantage that data writes are immediately transmitted to external memory for access by other devices or processors. For example, by employing write-through cacheability, a graphics write operation to a frame buffer is immediately output to the frame buffer for prompt display on a display device. However, write-through cacheability has the disadvantage that a separate bus transaction is required to perform a partial write operation whenever a data unit is modified within the DCU, resulting in considerable bus traffic.

Another conventional cache protocol, "write-back" protocol, can be employed to limit the amount of bus traffic. In the write-back cache protocol, data units which are modified within the DCU are not immediately transmitted to external memory. Rather, external data writes are held in abeyance. Ultimately, the entire cache line containing any modified data units is written to the external memory in burst mode. The write-back cache protocol has the advantage that bus traffic is minimized because individual data write operations are not sent to external memory via partial writes but are accumulated, then transmitted in burst mode. However, the write-back cache protocol may be inappropriate for data writes which require immediate output such as graphic writes or input/output operations.

A third cache protocol, "write-protected" protocol, is employed for caching data from memory locations which need not receive write requests. In the write-protected cache protocol, data units are cached to allow memory load requests to be expedited. However, any write operations to data units within a write-protected cache line are ignored or are handled specially.

Thus, a number of conventional cache protocols are employed for processing data. In general, however, not all types of data are cacheable and, as noted, not all types of cacheable data are well-suited to each cache protocol.

The following describes several issues which arise within current state-of-the-art microprocessors which employ DCU's and summarizes some of the disadvantages in such microprocessors. Referring to FIG. 1, a conventional exemplary computer system 10 is illustrated in block diagram form. System 10 includes a microprocessor 12 connected through a system bus 14 to several external devices including a RAM 16, an I/O unit 18, a ROM 20, and a DMA controller 22. A frame buffer 24 and a graphics display device 26, such as a CRT, are also connected to microprocessor 12 through system bus 14.

FIG. 1 also illustrates several of the primary functional components within the microprocessor 12 including an instruction fetch and issue unit 28, an address generation unit (AGU) 30, a DCU 32, a translation look-a-side buffer (TLB) 34 and a page miss handler (PMH) 36, each interconnected along a CPU bus 38. A bus unit 40 interconnects CPU bus 38 and system bus 14 for processing communication between the components of the microprocessor and the external devices.

A number of other components to the microprocessor are not illustrated. Rather, only relevant functional components are set forth.

Within microprocessor 12, instruction fetch and issue unit 28 generates memory instructions such as memory load or store operations or input or output instructions. Instruction fetch and issue unit 28 additionally generates numerous non-memory related instructions which will not be described herein. AGU 30 calculates the address for the instructions issued by instruction fetch and issue unit 28. The address may correspond, for example, to a physical address within RAM 16 or ROM 20 or to a frame buffer address within frame buffer 24, or perhaps to a DMA or I/O address. In a "real" mode of operation, AGU 30 generates physical addresses corresponding to the memory instructions. In a "protected" mode of operation, AGU 30 generates a linear address which corresponds to a physical address. In protected mode, to access an external memory location defined by a physical address, the linear address is first converted to a physical address. PMH 36 performs a page table walk to determine a physical address corresponding to a linear address. To expedite translation of linear addresses to physical address, TLB 34 maintains a cache of physical address/ linear address translations for many of the most recently accessed pages of memory.

Actual memory access is controlled by DCU 32 which first determines whether the data subject to the memory access is contained within internal cache lines within the DCU and, if not, dispatches external memory instructions through bus unit 40.

As noted above, not all types of data are cacheable. Further, not all cacheable data is appropriate for the write-back cache protocol, write-through cache protocol or write-protect cache protocol. Accordingly, information regarding the type of data to be accessed should be known before a determination can be made as to whether or how a memory instruction can be processed by DCU 32. For example, graphics data I/O data is generally considered to be inappropriate for write-back caching, since it is desirable that I/O data be immediately input or output. As another example, ROM data is generally considered to be inappropriate for write-back or write-through caching, since the ROM data, if held in the cache, could be updated or modified in a manner incompatible with the read-only nature of the ROM. Another type of data which is considered to be uncacheable is "memory mapped I/O." Memory mapped I/O, also called active memory, is a memory location which is used to directly control an input/output device or other device. For example, a read to a memory mapped I/O location may result in a disk drive being activated or may result in the entire computer system being rebooted. Hence, memory mapped I/O represents memory which can have side effects even as a result of a read or load operation. Accordingly, it may be inappropriate to cache memory mapped I/O, particularly with write-back or write-protected protocol. Hence, a determination of the cacheability of data or the type of cache protocol appropriate for the data may be necessary before the memory instruction accessing the data can be properly processed.

One method for determining whether a memory location subject to a memory instruction contains cacheable data is to simply attempt an access to the DCU. If the data is found within the DCU, then the data must be cacheable and the memory instruction can be processed accordingly. If the data is not found within the cache, then the memory instruction is transmitted on the system bus to access the actual memory location. The system bus or bus unit is provided with logic circuitry for determining whether the memory location contains cacheable data. Such bus logic can be rather complicated and performance critical. In general, the need to access the system bus to determine cacheability increases bus traffic. In particular, data cannot be allocated in the cache unless it has been first read.

One method for reducing bus traffic is to perform a "write allocate" operation. In one common method, "write allocate via read-for-ownership", the microprocessor, on a write that misses the cache, issues a "read-for-ownership" bus transaction to fetch line into the cache.

Once the read-for-ownership has been performed, an entire cache line containing the data unit to be written to is stored in the DCU. Thereafter any additional writes to the same cache line may be performed by merely modifying data within the cache line. Ultimately, the cache line is written-back to the external memory in burst mode. Write-allocate can thereby achieve a decrease in bus traffic, particularly in circumstances where several writes are performed to memory locations within a single cache line.

Although write-allocate has numerous advantages as far as limiting bus traffic, it is not easily implemented in current state-of-the-art microprocessors which use external logic circuitry for determining whether the memory location contains cacheable data. In particular, the read-for-ownership, required during the write-allocate, may have undesirable side effects which can occur because the read-for-ownership requests an entire cache line of data rather than merely a single unit of data. The reading of an entire cache line of data may be incompatible with certain external devices such as I/O devices which are not designed to accommodate a read-for-ownership. For example, certain I/O devices expect a write operation to be performed prior to any read operation. A read-for-ownership may attempt to access a memory location which has not received a prior write operation, resulting in a malfunction within the I/O device, or other undesirable side effect. The read-for-ownership can also have side effects if the memory accessed by the read-for-ownership is memory mapped I/O. As noted above, the act of reading from memory mapped I/O may result in a secondary effect, such as the entire system being rebooted.

A true write-allocate via read for ownership operation cannot be safely performed without the microprocessor knowing in advance whether the memory location subject to the write-allocate operation contains memory mapped I/O or other memory types which may have undesirable side effects.

As noted above, ROM data is generally considered to be uncacheable or cacheable subject only to write-protect protocol. To determine whether a memory location specified by a memory instruction contains ROM, the computer system may attempt to write to the memory location, then perform a read to determine whether the write operation was performed or ignored. If ignored, the memory location is thereby determined to be ROM and any subsequent memory instruction to that memory location bypasses the DCU. Such querying of the memory location requires at least two system bus transactions, further increasing bus traffic.

Some systems employ write-protect cache protocol to process ROM data. Although the write-protect cache protocol allows ROM data to be cached by ignoring or suppressing writes to the ROM, certain problems arise. First, since ROM data is handled differently within the cache than regular data, the fact that the data is ROM data must be determined prior to caching the data, requiring a system bus transaction resulting in the aforementioned bus traffic problems and other complications.

Moreover, many computer systems place memory mapped I/O "behind" a ROM. In such systems, the suppression of writes to cached ROM data may have undesirable side effects. FIG. 2 illustrates a video output device containing memory mapped I/O wherein the video output device is placed "behind" a ROM. More specifically, FIG. 2 illustrates a ROM 50 and a video output device 52 both coupled to both a read/write bus 54, a separate physical address bus 56 and to a data bus 58. Physical address bus 56 is coupled to ROM 50 through a comparator 60 and an AND gate 62. Physical address bus 56 is also connected to video output device 52 through a comparator 64 and a NAND gate 66. AND gate 62 and NAND gate 66 each both also receive a read or write signal along read/write bus 54.

When a memory instruction to a memory map I/O location is dispatched from a microprocessor, a read or write signal is dispatched along bus line 54 while a physical address corresponding to the instruction is dispatched along bus 56. To determine whether ROM 50 needs to respond to the instruction, comparator 60 compares the physical address of the instruction received along bus line 56 with a table or other logic containing all physical addresses within ROM 50. If the physical address is identified as a memory location within ROM 50, an enable signal is transmitted from comparator 60 to AND gate 62 enabling the AND gate to transmit a read operation to ROM 50. Since ROM 50 contains read-only memory, write operations are not enabled. Data retrieved from ROM 50 is transmitted to data bus line 58 along path 68.

Generally, all devices capable of receiving read or write requests have different physical address ranges, such that only one device receives an enable signal and can respond to the read or write request. However, video output device 52 is configured with the same physical address space as ROM 50.

Comparator 64 thereby generates an enable signal for any read or write to a physical address within the same range of physical address values as defined by comparator 60. AND gate 66, however, includes an inverted input along the read/write line such that only write operations are enabled, rather than read operations. Data necessary for the write operation is received from data bus line 58 along path 70.

Hence, ROM 50 and video output device 52 share the same physical address space. ROM 50 responds only to read requests to addresses within the physical address space whereas video output device 52 responds only to write request within the physical address space. Hence, a single range of physical addresses accommodate both the ROM and the video output device. Furthermore, to a certain extent, input and output bus lines and other hardware devices can be shared between the ROM and the video output device. The use of the same physical address space for the video output device is what is referred to as placing the video output device "behind" the ROM.

An attempt to cache ROM data while ignoring writes to the physical address space of the ROM may not work effectively if a second device, such as a video output device, is placed behind the ROM. Indeed, if all writes to the physical address space to the ROM are ignored, then video output device 52 will not receive any write signals and will not be able to display any data. There is a need to provide a method for caching ROM data which also allows devices placed behind the ROM to be operated properly.

Hence, a fundamental problem arises in many conventional microprocessors which process both cacheable and uncacheable data, namely, a memory request must to be transmitted onto the system bus before the cacheability or uncacheability is known, resulting in considerable bus traffic. From a performance standpoint, it is desirable to minimize the amount of bus traffic. The need to perform numerous external memory requests merely to determine the cacheability or uncacheability of data may cause a significant loss in overall processor efficiency. Accordingly, there is a need to provide a method and apparatus for minimizing or eliminating the need to perform external memory requests to determine the cacheability or uncacheability of data.

The need to limit bus traffic is even greater in computer systems employing multiple microprocessors wherein two, three or more microprocessors compete for access to a single system bus.

In the foregoing description of FIGS. 1 and 2, it was assumed that any memory instruction generated by the microprocessor can immediately be executed once the physical address for the memory instruction has been determined. However, with certain microprocessor architectures and for certain applications, a memory instruction must be deferred pending the resolution of one or more conditions.

In such systems, once the physical address is determined, the memory instruction cannot, or should not, be immediately executed. Such may occur, for example, in a microprocessor capable of generating out-of-order or speculative memory instruction operations. In an out-of-order microprocessor, memory instruction operations may be issued by an issue unit in an order other than that which is defined by a software program. Out-of-order issuing of memory instructions may be employed to enhance overall processor efficiency by exploiting any parallel processing capabilities of the microprocessor. When memory instruction operations are issued out-of-order, it may be necessary to hold one or more of the operations in abeyance pending execution of later issued operations. For example, the execution of a memory instruction may require deferral until the resolution of a branch condition, such as an "If" statement.

In a microprocessor architecture capable of speculative processing, further efficiency is gained by performing a branch prediction upon the occurrence of any unresolved branch condition. Branch prediction allows commands subsequent to the branch to be speculatively processed pending resolution of the branch condition. In other words, for each branch condition the microprocessor predicts which branch is to be taken, then executes subsequent instructions speculatively. The ability to execute commands speculatively further exploits any parallel processing capability of a system by allowing at least some commands which depend upon a branch condition to be performed prior to actual resolution of the branch condition. If the operation branch prediction is correct, the speculative instructions based on the predicted branch are "retired" and a windfall in processing speed is achieved. If the branch prediction is incorrect, the speculative instructions are flushed or otherwise abandoned. General aspects of out-of-order and speculative processing are described in "Superscalar Microprocessor Design" by Mike Johnson, Prentice-Hall, Inc., 1991.

Numerous limitations exist as to which commands or instructions can be performed out-of-order and which can be performed speculatively. One possible limitation to the execution of instructions and commands is that actual instructions to memory or input/output devices may require deferral until the execution of prior instructions or until the resolution of prior branch conditions. For example, it may be undesirable to perform a speculative load or store to memory mapped I/O location. Such a speculative load or store may result in a disk drive being activated or perhaps result in the entire computer system being rebooted. Such a side effect could have serious consequences, if the speculative memory store instruction was based on a mis-predicted branch. Numerous other problems can arise if speculative instructions are dispatched from the microprocessor to external devices. For example, speculative memory instructions to a frame buffer or I/O unit can result in speculative data being displayed or otherwise output from the system, again based on a possible mis-predicted branch.

The use of an out-of-order microprocessor enhances the need to provide a mechanism for determining or predicting the consequences or side effects of memory operations prior to dispatching those operations to external devices. There is a particular need to solve memory access problems within a computer system having one or more out-of-order microprocessors.

SUMMARY OF THE INVENTION

In accordance with one aspect of the invention, an improvement is provided within a computer processor wherein a "memory type" value associated with a memory address is explicitly determined by the computer processor. The memory type value identifies memory processing attributes of memory information such as data or instructions. The memory type value may indicate, for example, whether data stored within a certain range of physical addresses is cacheable or uncacheable. For cacheable data, the memory type may indicate whether the cacheable data is subject to write-through cacheability or write-back cacheability. In a computer processor capable of dispatching speculative memory instructions, the memory type may, for example, indicate whether memory is speculatable or non-speculatable.

By explicitly maintaining memory type information within the computer processor, the proper manner for processing a memory instruction can be determined explicitly, without requiring a memory request or bus access. For example, if the memory type corresponding to a memory instruction is identified as an uncacheable memory type, then no cache access is attempted. Hence, no read-for-ownership or other system bus transaction is required to determine the uncacheability of the data. If the memory type of the memory instruction is identified as a non-speculatable memory type, then a speculative load from a memory mapped I/O location can be easily avoided, again without requiring an initial bus transaction to determine whether the memory location, subject to the instruction, contains memory mapped I/O.

Specific memory types include uncacheable and non-speculatable memory (UC), uncacheable speculatable write-combining memory (USWC), restricted cacheability speculatable memory (RC), uncacheable non-speculatable memory mapped interrupt memory, write-through cacheable and speculatable memory (WT), write-protected cacheable and speculatable memory (WP) and write-back cacheable and speculatable memory (WB).

In an exemplary embodiment, a table relating memory types to physical address spaces is stored within memory type range registers (MTRR's) within a PMH of the computer system. A page table walk, employed to determine a physical address for a memory instruction, returns both the physical address, obtained by walking page tables in memory and the associated memory type obtained by presenting the physical address to decoding logic. To expedite a determination of the memory type for a memory instruction, memory type values are cached within a TLB along with physical and linear addresses. The TLB is operated both in real mode and in protected mode to allow for determining the memory type value.

In the exemplary embodiment, the computer system is a multiprocessor system having, for example, four microprocessors with the microprocessors interconnected by a system bus to peripheral components such as a RAM, ROM, DMA controller, frame buffer, input/output device and external secondary cache. Each microprocessor of the multiprocessor system includes an out-of-order engine for issuing speculative and non-speculative memory instructions, a reservation station (RS) for allocating the memory instructions, a reordering buffer (ROB) for ordering and retiring speculative instructions. Also included is a non-blocking DCU, a TLB, a PMH, and a memory ordering buffer (MOB) which stores and orders memory instructions prior to dispatching to external devices. The MOB checks memory instructions for memory ordering effects and defers dispatching any memory instructions to external devices until memory ordering problems are resolved.

The MOB examines the memory type of each memory instruction, in part, to predict memory ordering effects. If the memory type for a memory instruction is UC, then no speculative memory accesses are permitted and the MOB defers dispatching the memory instruction to the system bus until the instruction has retired. For a WB memory type, speculative accesses are permitted and the MOB allows memory instruction loads to pass other loads and also allows memory instruction loads to pass previous memory stores. The MOB, however, prevents memory instruction stores from passing loads. Furthermore, within the MOB, loads to UC memory types are strongly ordered but loads to non-UC memory types are allowed to pass UC loads.

The DCU also examines the memory type value and processes memory instructions accordingly. Memory instructions to UC memory types are not cached. Memory addresses in WB memory are cached within the DCU and are subject to write-back operations and write-allocate operations. Memory instructions to WT-type data are stored and updated within the DCU and subject to write-through operations. Memory instructions to WP memory are sent to the MOB for eventual transmission on the system bus without updating the DCU. WP data type is particularly employed for caching ROM data.

Memory instructions to a USWC memory type are combined within a write-combining buffer with data from other USWC memory type instructions. After being combined within the write-combining buffer, groups of USWC data units are output along a system bus in burst mode.

By defining explicit memory types associated with physical address spaces, and by explicitly storing those memory types within the computer processor, memory instructions can be properly and easily controlled in accordance with the memory type to, for example, avoid undesirable memory side effects and minimize system bus traffic by limiting the number of memory requests to determine the memory type. Accordingly, disadvantages of conventional systems are avoided and the objects of the invention set forth above are achieved. Other objects and advantages of the invention will be apparent from the detailed description of the invention which follows, in which exemplary method and apparatus embodiments of the invention are described.

BRIEF DESCRIPTION OF THE DRAWINGS

FIG. 15 is an exemplary entry of a translation look-a-side buffer in accordance with aspects of the present invention.

DETAILED DESCRIPTION OF PREFERRED EMBODIMENTS

Referring to the remaining figures, various embodiments of the invention will now be described. The embodiments described herein relate to a computer system having one or more microprocessors, which may be capable of speculative and out-of-order execution of instructions, wherein memory type values are explicitly stored within the microprocessors to facilitate the processing of memory instructions. As will be described more fully below, the explicit memory type values may indicate that memory accesses by a memory instruction are, for example, uncacheable or cacheable, speculatable or non-speculatable. Although described primarily with reference to a microprocessor system capable of speculative and out-of-order execution of instructions, aspects of the invention are also advantageously incorporated in in-order microprocessors. Furthermore, although the invention is described primarily with reference to a CISC microprocessor which process micro-operations or micro-instructions, principles of the invention are also applicable to processors which handle macro instructions directly. Principles of the invention are applicable to RISC processors. An overview of an exemplary computer system incorporating the invention is provided in FIGS. 3–6. Detailed descriptions of the processing of memory instructions to memory locations of particular memory types are described with respect to FIGS. 7–12. Reordering of memory instructions is described with respect to FIGS. 13 and 14.

Overview

Figure 3:
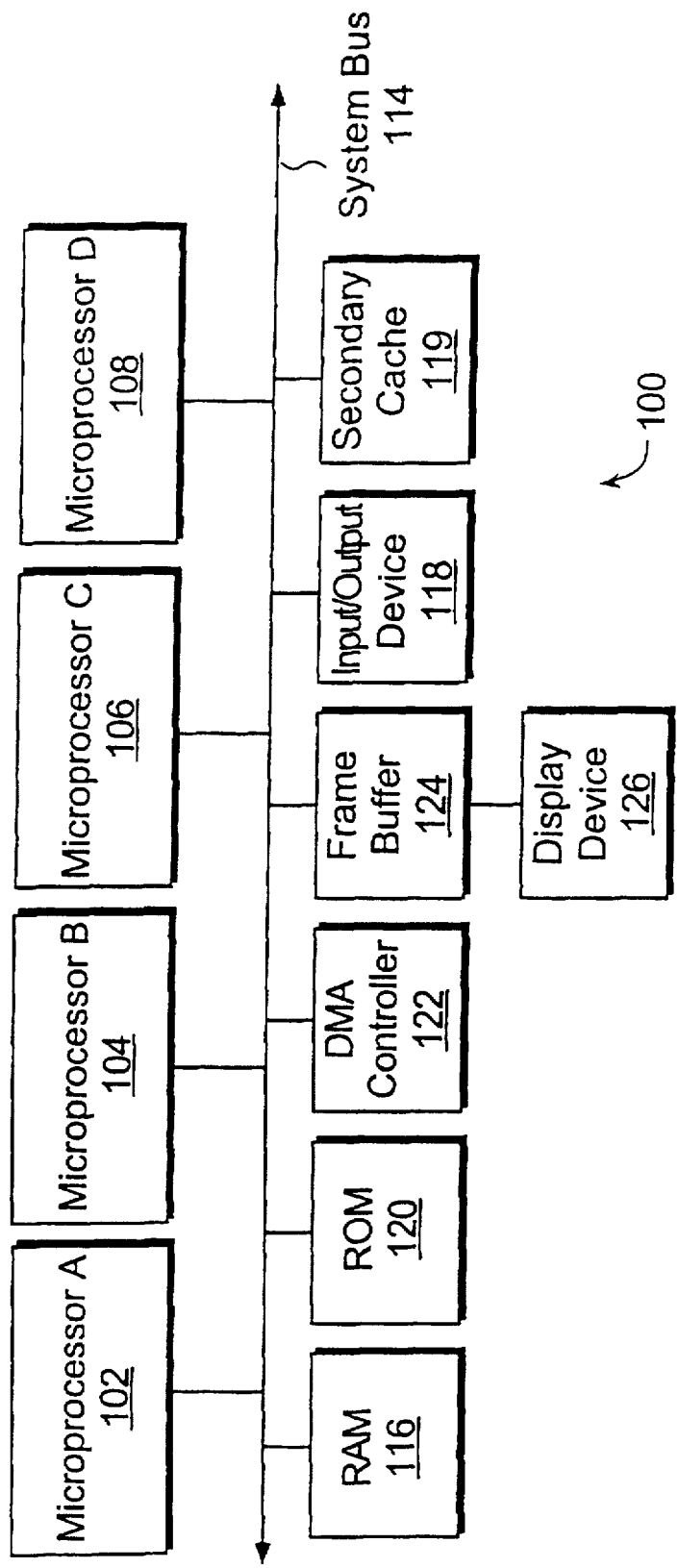
FIG. 3 is a block diagram illustrating a multi-processor computer system configured in accordance with aspects of the present invention.

FIG. 3 illustrates a multiprocessor computer system having one or more microprocessors, for example four microprocessors 102, 104, 106 and 108 interconnected by a system bus 110. Each microprocessor may be capable of speculative and out-of-order execution of instructions. A RAM 116, I/O device 118, secondary cache 119, ROM 120 and a DMA controller 122 are connected through system bus 114 to each of the microprocessors 102–108. A frame buffer 124 and CRT display 126 are also connected to system bus 114. DMA controller 122 may represent any of a number of DMA controller devices. Other memory devices such as disk drives, CD ROM's and the like may also be connected to system bus 114. I/O device 112 may include any of a number of input or output devices such as keyboards, modems, and the like. Each of the microprocessors illustrated in FIG. 3 may be identical or may be different. Although FIG. 3 illustrates secondary cache 119 as being separate from the microprocessors and interconnected thereto by system bus 114, in other implementations a secondary cache may be contained within each microprocessor. In still other implementations, a secondary cache is provided within each microprocessor and a tertiary cache is provided which is connected through the system bus to the various microprocessors.

Figure 4:
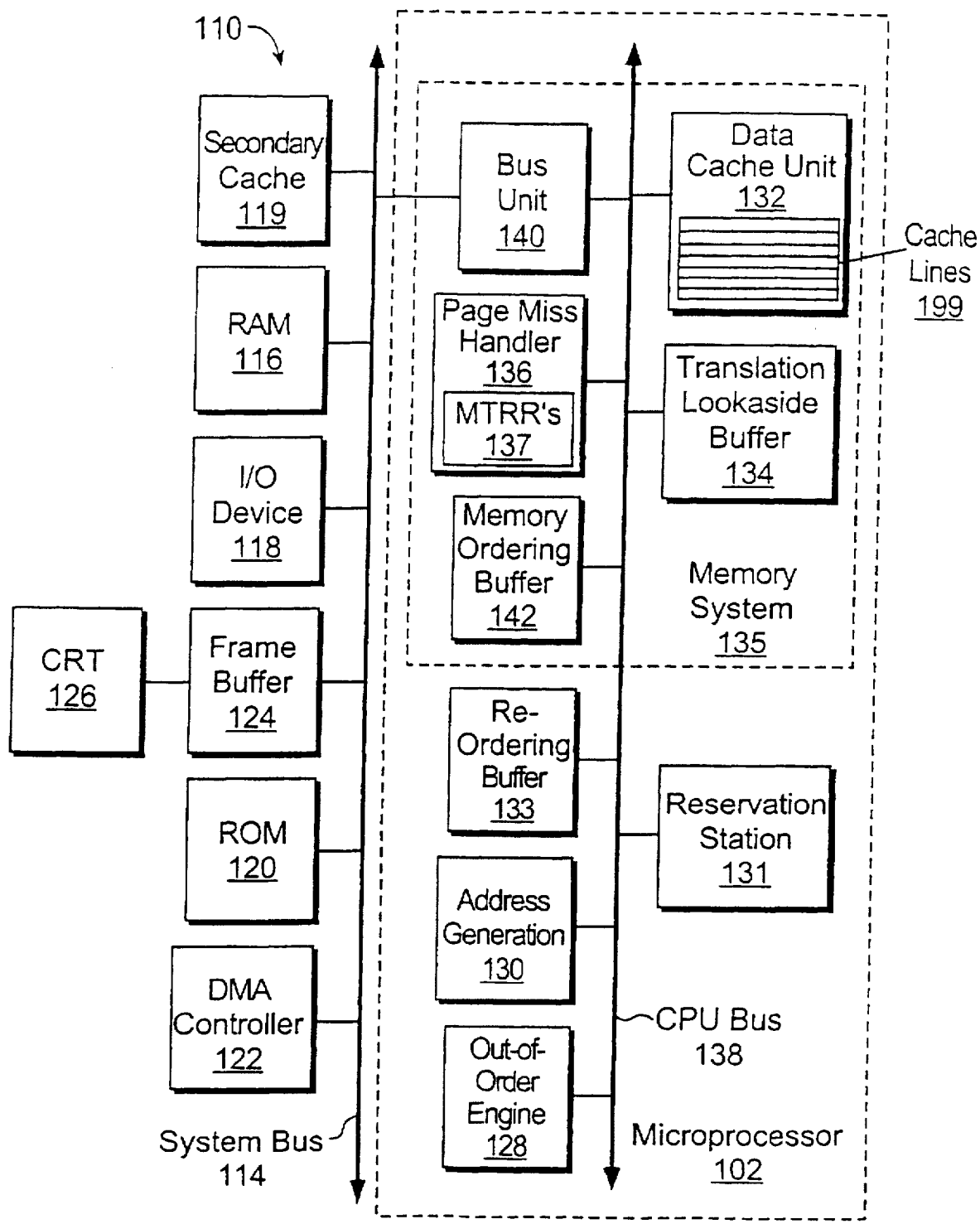
FIG. 4 is a block diagram particularly illustrating internal components of one of the microprocessors of FIG. 3 with the microprocessor of FIG. 4 being capable of speculative and out-of-order execution of memory instructions.

FIG. 4 illustrates selected functional components of a microprocessor of FIG. 3, such as microprocessor 102, all interconnected by one or more busses symbolically illustrated by CPU bus 138. In particular, FIG. 4 illustrates an out-of-order engine 128 which generates micro-instructions, referred to herein as micro-operations or "uOP's", such as memory loads and stores. The uOP's are, in general, generated by out-of-order engine 128 in a sequence which may differ from the sequence in which uOP's are generated within an in-order microprocessor. Further, out-of-order engine 128 is capable of making predictions at branch operations, such as "If" statements, then speculatively generating uOP's subsequent to the branch operations. The uOP's are generated out-of-order and/or speculatively, in part, to allow microprocessor 102 to exploit any parallelism within the program, and to exploit pipelining capability of the microprocessor.

In a protected mode, the internal addresses for uOP's generated by out of order engine 128 are calculated by AGU unit 130. In real mode, AGU 130 generates a physical address. Unless otherwise noted, protected mode operation will be described herein. The internal address may be linear or virtual addresses or other equivalent addresses which are mapped into the physical address space. In other implementations of the invention, separate internal and physical addresses may not be defined.

The uOP containing the linear address is output from AGU 130 onto CPU bus 138 where the uOP is intercepted and stored by an RS 131. RS 131 is the functional unit of microprocessor 102 which allocates uOP's that have not yet been executed, then dispatches the uOP's to other functional units according to speculative data dependencies and according to the availability of the other functional units. Details of a particular exemplary implementation of a reservation station may be found in co-pending U.S. patent application Ser. No. 08/172,737, entitled "Method And Apparatus For Scheduling The Dispatch Of Instructions From A Reservation Station", filed Dec. 27, 1993, and assigned to the Assignee of the present application which is incorporated by reference herein.

Microprocessor 102 also includes a Reorder Buffer (ROB) 133 which stores speculative results from uOP's dispatched by RS 131 and executed by one of the functional units. ROB 133 collects the results from speculative uOP's, reorders the uOP's, then retires the uOP's. Thus, whereas out-of-order engine 128 may generate uOP's in an order other than that which appears in a computer program, ROB 133 reorders the retirement of executed uOP's to yield the sequence of events specified by the computer program. An executed uOP is retired once it becomes non-speculative, i.e., once all unresolved antecedents to the uOP have been resolved. Thus, for example, for uOP's speculatively generated following a branch condition, such as an IF statement, uOP's are retired after the branch condition has been evaluated and taken. In particular, if the branch prediction is determined to be correct, uOP's speculatively executed beyond the branch statement are then retired. If the branch condition is determined to be incorrect, speculative uOP's following the branch statement are squashed or otherwise invalidated. Details of a particular exemplary implementation of ROB 133 may be found in co-pending U.S. patent application Ser. No. 08/177,244, entitled "Speculative And Committed Resource Files In An Out-Of-Order Processor", filed Jan. 4, 1994, and assigned to the Assignee of the present application which is incorporated by reference herein.

uOP's which involve memory accesses such as memory loads and memory stores are executed by a memory system 135. Memory system 135 includes a DCU 132, a TLB 134, a PMH 136, a bus unit 140 and a MOB 142. TLB 134 maintains a cache of address translations between linear addresses and corresponding physical addresses. In use, a uOP dispatched by RS 131 is intercepted from CPU bus 138 by TLB 134, which determines the physical address corresponding to the linear address of the uOP. If the address translation is found therein, TLB 134 re-dispatches the uOP, updated to include the physical address, onto CPU bus 138.

DCU 132 includes internal cache lines 199 which maintain data for many of the most recently accessed memory locations. DCU 132 intercepts the uOP containing the physical address and accesses internal cache lines to determine if the data for the memory access of the uOP is already contained therein. If the data is contained within DCU 132, the data is retrieved from the DCU and dispatched onto CPU bus 138 for further processing by other functional units of microprocessor 102. If the data is not found within DCU 132, system bus unit 140 is accessed to transmit memory requests to secondary cache 119 or to external memory such as RAM 116 or ROM 120 to access the data specified by the uOP.

DCU 132 is a non-blocking cache which includes fill buffers (not shown). The fill buffers are advantageously exploited for storing data associated with frame buffer writes, i.e., data of the USWC memory type. DCU 132 preferably employs MESI protocol, wherein M identifies a modified cache line, E identifies an exclusive cache line, S identifies a shared cache line and I identifies an invalid cache line. As will be described more fully below, DCU 132 is capable of a variety of cache protocol operations including write-through, write-back and write-protect cache operations.

As noted, the system may include a secondary external cache 119. If a secondary cache is provided, memory load or store operations which are not satisfied by DCU 132 are transmitted to secondary cache 119. If the load or store operation cannot be satisfied with data contained within secondary cache 119, then the load or store is transmitted to external memory devices such as RAM 116, or ROM 120. For clarity and brevity, in the following descriptions it is assumed that a secondary cache is not provided. The secondary cache is only discussed with reference to the restricted cacheability memory type described below wherein a distinction is made between data cached within DCU 132 and data cached within the secondary cache. Furthermore it should be understood that additional external caches may be provided and several levels of caching may be accommodated.

Referring again to TLB 134, if the translation between the linear address and a physical address is not cached within TLB 134, then PMH 136 performs a page table walk to determine the corresponding physical address. If the uOP causing the TLB miss is a non-speculative uOP, PMH 136 merely performs a page table walk by issuing page directory entry ("PDE") and page table entry ("PTE") load operations to PDE and PTE tables. If, however, the uOP causing the TLB miss is a speculative uOP, then PMH 136 performs a page table walk speculatively. The details of the speculative page table walk may be found in co-pending U.S. patent application Ser. No. 08/176,363, filed Dec. 30, 1993, entitled "Method and Apparatus for Performing Page Table Walks in a Microprocessor capable of Processing Speculative uOP's", assigned to the Assignee of the present invention which is incorporated by reference herein.

During the page table walk, PMH 136 accesses MTRR's 137 to determine the memory type for the uOP being processed. The manner by which PMH determines the memory type value during a page table walk may be found in co-pending U.S. patent application Ser. No. 08/171,528, filed Dec. 22, 1993, entitled "Method and Apparatus for Determining Memory Type by a Processor", assigned to the Assignee of the present invention which is incorporated by reference herein. During a protected mode page table walk, PMH 136 accesses MTRR's 137 during a page table walk to determine the memory-type value for the corresponding linear and physical addresses that missed the TLB. In real mode, PMH 136 merely accesses MTRR's 137 merely to determine the memory-type for the corresponding physical address without performing a page table walk. The memory-type and corresponding physical addresses provided in the MTRR's may be defined at run time by commands within a computer program or may default to predetermined values.

To expedite a determination of the memory type for each uOP, TLB 134 is preferably configured to cache a memory type value for each linear address/physical address element otherwise cached therein. Hence, the MTRR's of PMH 136 are accessed only in the event of a TLB miss. In the event of a TLB hit, the memory type value is determined from TLB 134 while the corresponding physical address and linear address combination is accessed. To allow memory type values to be accessed from TLB 134 regardless of whether the computer system is operating in a real mode or protected mode, TLB 134 is operated in both real and protected mode. If desired, a separate data TLB and a separate instruction TLB may be provided. In such an implementation, memory type values are preferably cached within both but can be cached in only one or the other in other implementations. Details of the operation of TLB 134, particularly the manner by which TLB operates in real mode, are described in co-pending U.S. patent application Ser. No. 08/176,364, filed Dec. 30, 1993, entitled "Method and Apparatus for using a Translation Look-a-side Buffer in Real Mode", assigned to the Assignee of the present invention which is incorporated by reference herein.

In protected mode, a uOP dispatched by RS 131 is latched from CPU bus 138 by TLB 134 which performs a look-up to determine whether its internal cache lines contain the physical address and memory type corresponding to the linear address of the uOP. If the address translation is found therein, TLB 134 re-dispatches the uOP, updated to include the physical address and memory type, onto CPU bus 138. In real mode, the uOP dispatched by RS 131 is also latched from CPU bus 138 by TLB 134 which performs a look-up to determine whether its internal cache lines contain the memory type corresponding to the physical address of the uOP. If the memory type is found therein, TLB 134 re-dispatches the uOP, updated to include the memory type, onto CPU bus 138.

An exemplary cache line of TLB 134 is illustrated in FIG. 15. Cache line 170 includes space for a linear address 172, space for a physical address 174, and space for a memory type value 176. As noted, cache line 170 stores a physical address and memory type value when the microprocessor is operating in real mode. In protected mode, cache line 170 stores a linear address in addition to the physical address and memory type value. Cache line 170 may additionally include other information (not shown) for facilitating the caching of physical addresses and linear addresses such as bits and data parity bits.

Figure 16:
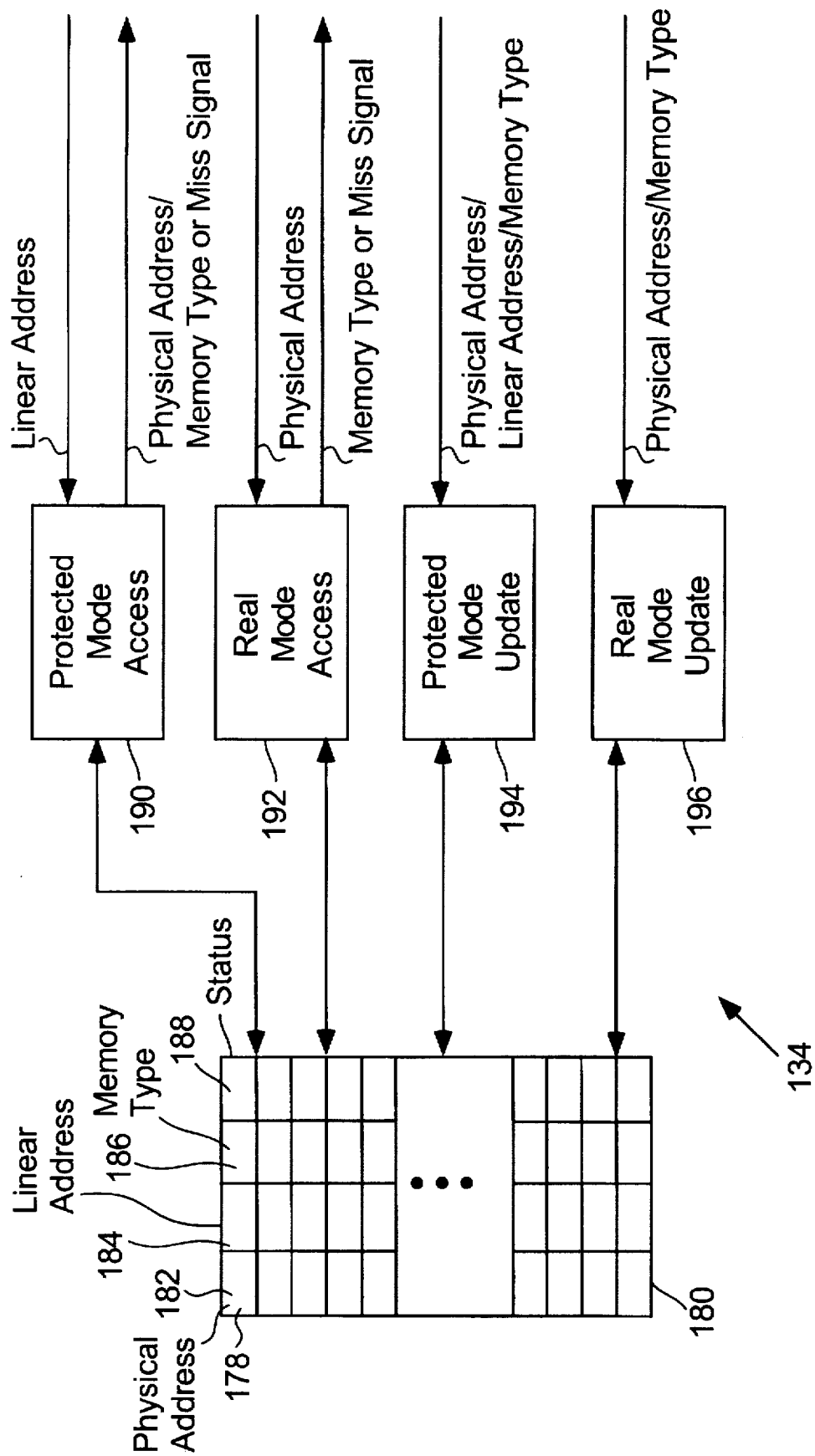
FIG. 16 is a block diagram illustrating a translation look-a-side buffer of the microprocessor of FIG. 4.

Referring to FIG. 16, the function and operation of TLB 134 will now be described in further detail. TLB 134 includes a set 180 of TLB lines 178, each storing a physical address 182, a linear address 184, a memory type 186, and a set of status bits 188. Thus, similarly to conventional TLB's, TLB 134 stores a physical address and a corresponding linear address for a set of recently accessed physical addresses. However, unlike conventional TLB's, TLB 134 stores memory type 186 which identifies whether the data or instructions stored with the physical address may be accessed immediately or whether the access must be deferred pending some condition such as the resolution of a speculative branch condition. Also, unlike conventional TLB's, TLB 134 operates both in real mode and in protected mode, to allow memory type values to be retrieved even in circumstances where a translation between physical and linear addresses is not required such as can occur when operating in real mode rather than protected mode. Input and output from TLB 134 is along CPU bus 138 (FIG. 4.) In one embodiment, separate physical address and linear address busses are provided, with the other address bus being used to input data in protected mode and the physical address data being used to input data in real mode.

Various real mode and protected mode accesses are illustrated in FIG. 16 in block diagram form. As can be appreciated by those skilled in the art, the functions illustrated are preferably implemented with appropriate circuitry for high-speed access to the information contained within TLB cache lines 178. More specifically, FIG. 16 illustrates a protected mode access unit 190, a real mode access unit 192, a protected mode update unit 194 and a real mode update unit 196.

Protected mode access unit 190 receives a linear address and accesses TLB lines 178 to determine whether a linear address is stored within the TLB then outputs either a corresponding physical address and memory type or a TLB miss signal. Protected mode access unit 190 is employed whenever an address translation of a linear address to a physical address is desired. Protected mode update unit 194 operates to add a line to the TLB to update the TLB in the event of a previous TLB miss. Thus, when a TLB miss occurs, the miss signal output by protected mode access unit 190 is received by PMH 136 (FIG. 4) which performs a page table walk in response to the TLB miss and provides the physical address corresponding to the linear address causing the TLB miss. As illustrated in FIG. 4, PMH 136 also includes MTRR's 137 which provide the memory type for corresponding physical address locations, allowing the PMH to determine the appropriate memory type for the corresponding physical address for a page table walk. The method by which PMH 136 retrieves the memory type from MTRR's 137 is described in detail in the above-referenced U.S. patent application Ser. No. 08/171,528.

In protected mode, once the physical address and the memory type for a corresponding linear address subject to a TLB miss have been determined by PMH 136, the physical address, linear address, and memory type are stored in one of the TLB lines 178 by operation of protected mode update unit 194.

Protected mode access unit 190 and protected mode update unit 194 may be designed and configured in accordance with conventional TLB techniques with the exception that the memory type value must also be accessed or updated as appropriate.

Unlike conventional TLB's, TLB 134 includes real mode access unit 192 and real mode update unit 196 which operate to retrieve a memory type or update a memory type in real mode, respectively. More specifically, real mode access unit 192 receives a physical address and accesses lines 178 to retrieve a corresponding memory type value, then either outputs the memory type or a miss signal, depending upon whether the physical address is found within one of lines 178. Hence, real mode access unit 192 operates in a manner analogous to that of protected mode access unit 190 but receives a physical address rather than a linear address. If a real mode TLB miss signal is generated, PMH 136 (FIG. 4) accesses the MTRR's stored therein to determine the memory type corresponding to the physical address which generated the miss signal. As noted above, PMH 136 does not perform a page table walk in real mode, since such is not necessary because the physical address is already known. Rather, in real mode, PMH 136 merely accesses the MTRR tables with the physical address to retrieve the corresponding memory type. Further details regarding the manner by which the PMH operates in real mode to determine the memory type corresponding to a physical address are set forth in the above-referenced U.S. patent application Ser. No. 08/171,528.

Once the real mode TLB miss has been processed to retrieve the memory type corresponding to the physical address, TLB lines 178 are updated with the physical address and the memory type using real mode update unit 196. More specifically, real mode update unit 196 adds the physical address and the corresponding memory type to one of the lines within TLB 134 or replaces a line containing a previously stored address and memory type. Hence, the operation of real mode update 196 is analogous to that of protected mode update unit 194, but updates the physical address and memory type rather than the linear address, physical address and memory type as updated by protected mode update unit 194.

As with protected mode access and update units 190 and 192 described above, real mode access and update units 194 and 196 may be configured in accordance with conventional TLB circuitry modified to accommodate the memory type value and to operate in real mode rather than protected mode. Numerous different implementations may be provided consistent with the general principles of the invention described herein.

Thus, TLB 134 is accessed both in protected mode and in real mode to determine a memory type which indicates whether the information stored at the physical address is subject to an immediate memory access or is subject to an access which should be deferred. If the physical address is found within TLB 134, a hit signal is generated and the memory type, as well as other necessary information, such as the physical address, is output. If the physical address is not found within the TLB, then a miss signal is generated and PMH 136 (FIG. 4) is employed to determine the memory type based on the physical address and to perform a page table walk if necessary. Ultimately, in either case the memory type corresponding to the physical address is determined.

The physical address and the corresponding memory type are transmitted to MOB 142 (FIG. 4) which operates to defer processing of the memory operation accessing the physical address location, if necessary. Thus, if the memory type indicates that the information stored at the physical address is of a non-speculatable type, then MOB 142 operates to defer any access to the physical address such as a memory load or memory store until all conditions present to the memory access operation are resolved. For example, MOB 142 may defer processing of the memory access operation until speculative branch predictions are resolved. Once all such conditions present are resolved, MOB 142 dispatches the memory operation allowing the operation to access the physical address and load or store data therefrom. For memory types for which a memory access operation need not be deferred, such as for speculatable memory types, MOB 142 merely dispatches the memory operation immediately without deferring the operation. ROB 120 ultimately reorders and retires any speculative memory access instructions which were based on correctly predicted branches and squashed or killed instructions that were based on mid-predicted branches.

MOB 142 orders memory uOP's. More specifically, MOB 142 maintains lists of memory loads and stores and checks the loads and stores for possible adverse memory effects. An adverse memory effect may occur as a result of, for example, a speculative store being dispatched to external memory prior to a speculative load. MOB 142 reorders the memory access operations accordingly and may block execution of particular memory access operations until ordering problems are resolved. In particular, the MOB may block execution of memory uOP's that are not at retirement and are known to be non-speculatable. Further details of MOB 142 are provided below with reference to FIGS. 13 and 14.

Figure 5:
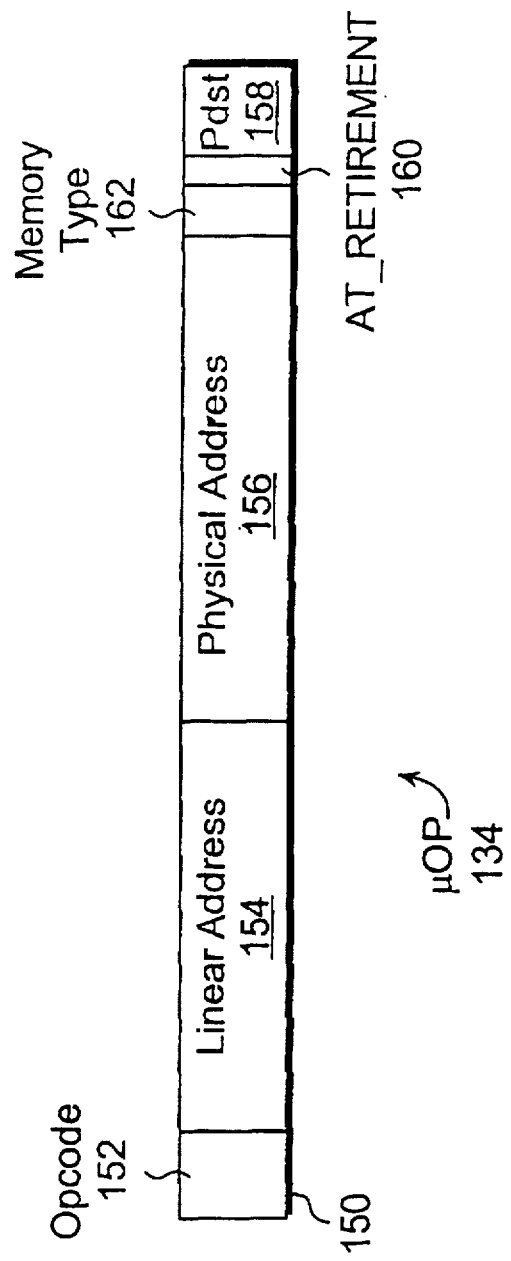
FIG. 5 is a symbolic illustration of a memory instruction processed by the microprocessor of FIG. 4.

An exemplary memory-related uOP 150 is symbolically illustrated in FIG. 5. uOP 150 includes an operation code (OPCODE) 152, space for a linear address 154, space for a physical address 156, and space for a physical destination address (PDST) 158. OPCODE 152 is a code indicating the type of memory operation to be performed and may, for example, identify a memory store or memory load operation. PDST stores a code which identifies the destination of the uOP within microprocessor 102. The PDST value allows the microprocessor to track uOP's and to ensure that the results of uOP's are ultimately forwarded to whichever functional unit requires the results. The PDST value also is indicative of the relative age of the uOP. That is, PDST values for uOP's generated are assigned in a numerical ascending order such that the relative ages of two uOP's can be determined by examining the respective PDST values therein. ROB 133 and RS 131 (FIG. 4) intercept and respond only to uOP's having a valid PDST value. ROB 133 and RS 131 simply ignore all uOP's which do not contain a PDST value, or which contain a PDST value which is not valid. Linear and physical address sections 154 and 156 store the linear and physical addresses, respectively, if known.

uOP 134 (FIG. 5) also includes an AT_RETIREMENT bit 160 which identifies whether the uOP is currently speculative or whether the uOP is ready to be retired and is therefore no longer speculative. The memory type is stored in a memory-type space 162. As noted above, the memory type indicates, among other things, whether the data, which is subject to the memory access uOP, is speculatable or non-speculatable, cacheable or non-cacheable, etc. Non-speculatable data types include data types such as graphics read and write operations, which are not performed speculatively. Speculatable data types include most other types of data. uOP 150 may additionally include a wide range of other information for facilitating the processing and execution of the uOP. For brevity and clarity, such additional information is not described herein, but further information regarding the uOP's structure may be found in the above-identified co-pending patent applications.

Table I lists six general memory types processed by the microprocessor of the invention along with an exemplary numerical value for storage in memory-type space 162 of uOP 134.

TABLE I

| Memory Type Value | Memory Type Meaning |
|---|---|
| 0 | UNCACHEABLE & NON-SPECULATABLE MEMORY. LOADS/STORES PERFORMED ONLY AT RETIREMENT. (UC) |
| 1 | UNCACHEABLE, SPECULATABLE WRITE COMBINED MEMORY. LOADS SPECULATE, STORES PERFORMED ONLY AFTER RETIREMENT. (USWC) |
| 2 | RESTRICTED CACHEABILITY & SPECULATABLE MEMORY. LOADS SPECULATE. STORES PERFORMED ONLY AFTER RETIREMENT. (RC) |
| 3 | WRITE THROUGH CACHEABLE & SPECULATABLE MEMORY. (WT) LOADS SPECULATE. STORES PERFORMED ONLY AFTER RETIREMENT. |
| 4 | WRITES PROTECTED CACHEABLE & SPECULATABLE MEMORY. (WP) LOADS SPECULATE. STORES TRANSMITTED TO EXTERNAL MEMORY, BUT NOT APPLIED TO CACHE DATA. |
| 5 | WRITE BACK CACHEABLE & SPECULATABLE MEMORY. (WB) LOADS SPECULATE. STORES PERFORMED ONLY AFTER RETIREMENT. |

As can be seen from Table I, specific memory types include an uncacheable and non-speculatable memory (UC), an uncacheable speculatable write-combining memory (USWC), a restricted cacheability and speculatable memory (RC), a write-through cacheable and speculatable memory (WT), a write-protected cacheable and speculatable memory (WP) and a write-back cacheable and speculatable memory (WB). Other memory types can be defined consistent with the general principles of the invention.

UC memory is uncacheable memory and includes, for example, memory mapped I/O. uOP's to UC memory are non-speculatable. In other words, loads and stores to UC memory are performed by the microprocessor only at retirement of the loads or stores. USWC memory is generally used for frame buffer memory. Loads to USWC memory are performed speculatively. Stores are performed only after retirement RC memory relates to memory which is cacheable only in a primary or L1 cache such as DCU 132, but not cacheable in an external secondary (L2) cache such as cache 199. RC loads may be performed speculatively. RC stores are performed only after retirement. WT memory is memory processed by a write-through cache protocol. Loads to WT memory are performed speculatively. Stores for WT memory are performed only after retirement. WP memory is memory well-suited for caching ROM data. Cache lines associated with load uOP's to WP memory are cached within the DCU. However, for store uOP's, cache line data is not updated. Nevertheless, store uOP's are written to external memory using partial writes. Loads to WP memory are performed speculatively. Stores to WP memory are performed only at retirement. WB memory is memory processed generally in accordance with a write-back cache protocol wherein data writes are first merged into a cache line, then written back to external memory using burst mode. Loads to WP memory are performed speculatively. Stores to WP memory are performed only after retirement.

In Table I, specific memory type numerical values are provided which identify the memory types. As can be appreciated, alternative numerical values or codes could also be employed.

As will be described more fully below, functional components of microprocessor 102 examine the memory type value of each uOP, to determine whether or how the uOP is to be processed. For example, if the memory type value of the uOP indicates WB memory, the uOP is processed generally in accordance with write-back cache protocol, subject to the speculation limitations noted above.

Thus, FIG. 4 illustrates microprocessor 102. FIG. 4 illustrates only relevant functional components of the microprocessor. For clarity, numerous implementation details are not explicitly shown. For example, the single CPU bus illustrated in the FIG. 4 may actually include several separate bus lines including separate busses for linear addresses, physical addresses, write-back results from the DCU, and OPCODE's. Also, the separate physical address of the bus may be interconnected only to the PMH, TLB and DCU if no other units need access to physical addresses. The out-of-order engine may include separate internal components such as a sequential instruction fetch, a microcode unit, and instruction decoder and an allocater unit. Also, integer and floating points units may be included within the microprocessor which are not expressly illustrated. A separate integer TLB may also be provided. The information represented by the uOP of FIG. 5 need not necessarily be stored together within the microprocessor. In particular, the uOP itself need not store both the linear and physical addresses. Indeed, separate linear and physical address busses may be provided. Additional information regarding general out-of-order processor components may be found in the above cited reference by Johnson.

Figure 6:
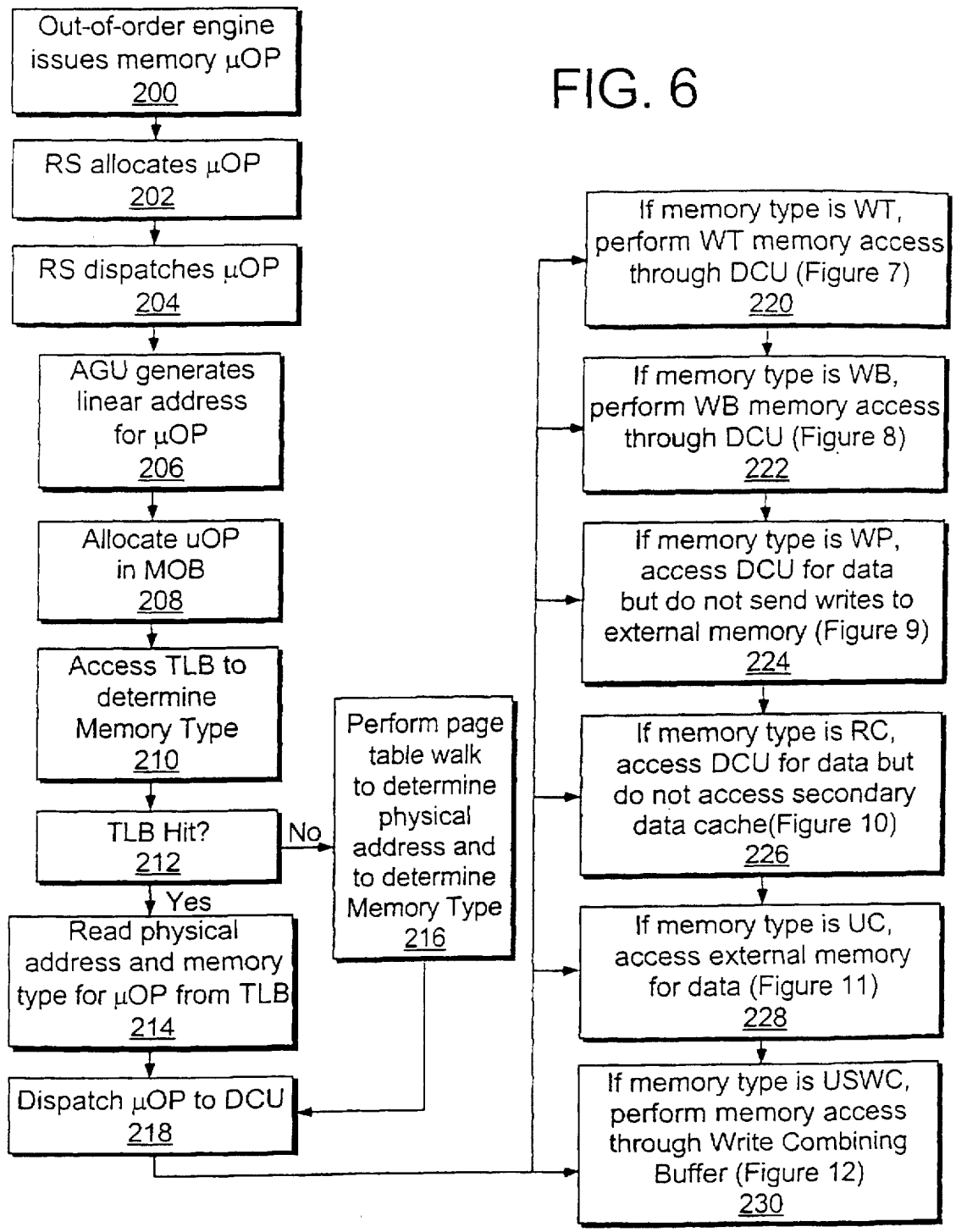
FIG. 6 is flow chart illustrating a method by which memory instructions are processed within the microprocessor of FIG. 4.

A method by which memory uOP's are processed within the microprocessor of FIG. 4 is illustrated in FIG. 6. Initially, at step 200, the uOP fetch and issue unit issues a memory uOP. Numerous non-memory uOP's are also issued. However, such are not pertinent to the invention and will not be described in detail herein. Next, RS 131 allocates, then dispatches the uOP at steps 202 and 204. AGU 130 determines the linear address for the uOP at step 206. If the microprocessor is operating in real mode, step 206 is bypassed, since only physical addresses are processed. In either case the uOP is then allocated in MOB at step 208.

At step 208, the memory type of the memory location identified by uOP is not yet known. At step 210, TLB 134 is accessed in an attempt to determine the memory type. As noted above, TLB 134 includes linear addresses and corresponding physical addresses and memory types for many of the most recently accessed pages of memory. If operating in protected mode, and a TLB hit occurs, then both the physical address and memory type are retrieved from the TLB. If operating in real mode, and a TLB hit occurs, then only the memory type is retrieved from the TLB, since the physical address is already known. Hence, unlike conventional TLB's, TLB 134 is accessed either in protected mode or real mode to retrieve information.

Whether a TLB hit or miss occurs is determined at step 212. The aforementioned step of reading the memory type or the memory type and physical address upon the occurrence of a TLB hit is performed at step 214. If a TLB miss occurs, execution proceeds from step 212 to step 216 where PMH 136 is accessed to perform a page table walk to determine both the physical address and the associated memory type. As noted above, PMH 136 includes MTRR's 137 which map memory types to associated ranges of memory such that the memory type can be determined during a page table walk. Execution then proceeds to step 218 from either step 214 or 216.

Thus, at step 218, the memory type for the uOP is known. At step 218, the uOP is dispatched to the DCU with the memory type value of the uOP updated to indicate the correct memory type and with the appropriate linear address or physical address. After step 218, execution branches according to the memory type value. If the memory type is WT, execution proceeds to step 220. If memory type is WB or WP, execution proceeds to steps 222 or steps 224, respectively. If the memory type is RC, UC or USWC, execution proceeds to steps 226, 228 or 230, respectively. In each of steps 220–230, the memory access identified by the uOP is performed in accordance with the specific memory type. The details of such processing will be described below with respect to FIGS. 7–12.

Thus, FIG. 6 provides a flow chart overview of a method by which memory uOP's are processed. As can be appreciated, the actual sequence of steps, and the specific methods by which each step is implemented may vary according to particular implementations. For example, it may be desirable to dispatch the uOP to the DCU and to the TLB simultaneously such that, if the memory type and physical address are retrieved from the TLB, the DCU may then immediately access its internal cache lines to satisfy the uOP. In such an implementation, if the physical address or memory type are not found within the TLB, the DCU access is then aborted.

In the exemplary embodiment described herein, the DCU caches data according to physical addresses. Hence, a DCU access can not be performed until the physical address for the uOP is known pending the result of the page table walk employed to determine the physical address. In other implementations, it may be desirable to cache data within the DCU according to linear addresses, such that a DCU access may at least be initiated prior to the determination of the actual physical address. Even in such an embodiment, it may be necessary to defer completion of the DCU access until the memory type is known.

It should also be noted that none of the steps illustrated in FIG. 6 require a predetermination of whether the uOP is speculative or non-speculative. For the most part, whether the uOP is speculative or non-speculative only affects the specific steps employed in processing the uOP, described below with reference to FIGS. 7–13.

The foregoing provides a brief overview of the operation of microprocessor 102, particularly the manner by which the microprocessor explicitly stores memory type values. Depending upon the implementation, the specific sequence of steps set forth in FIG. 6 may differ. With reference to the remaining figures, the methods and apparatus by which specific memory types are processed will now be described in greater detail.

Write-Through Memory Type Processing

Figure 7:
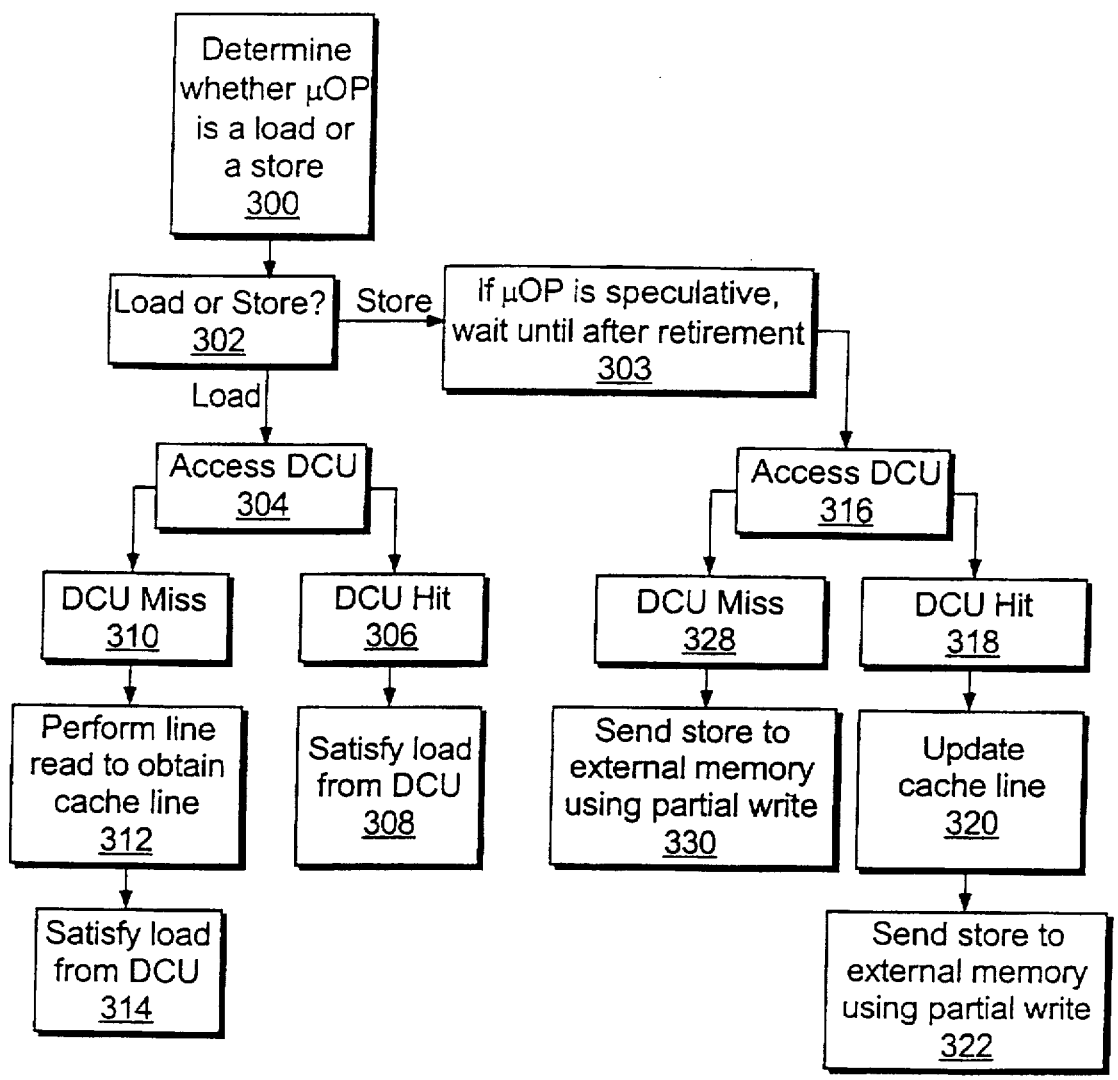
FIG. 7 is a flow chart illustrating a method by which memory instructions identifying write-through memory types are processed by the microprocessor of FIG. 4.

FIG. 7 illustrates a process by which memory uOP's to memory locations of the WT memory type are processed (step 220 of FIG. 6). Most of the steps set forth in FIG. 7 are performed by the DCU 132 and bus unit 144. However, if desired, the steps can be performed by other functional units.

Initially, a determination is made of whether the uOP is a load or a store operation, at step 300. Preferably, the OPCODE of the uOP identifies whether the memory uOP is a load or a store. If the uOP is a load, execution proceeds through step 302 to step 304 where DCU 132 accesses its internal cache lines to determine whether data for the memory location identified by the physical address within the uOP is already contained within an internal cache line. If a DCU hit occurs, execution proceeds through step 306 to step 308 where the data identified by the uOP is accessed from within the DCU and then dispatched to ROB 133 or to any other functional unit requiring the data identified in the uOP.

If a DCU miss occurs at step 304, then execution proceeds through step 310 to step 312 where a line read is performed to retrieve and obtain ownership of an entire cache line of data containing the memory location identified by the uOP. The actual external device which provides the cache line of data depends upon the memory location identified within the uOP. An exemplary device containing WT data is RAM 116. Preferably, the cache line of data is transmitted from the external device through DCU 132 via bus driver 140 using burst mode transmission. Once the cache line containing the desired data is read into DCU 132, the memory uOP is satisfied by accessing the cache line to retrieve the specific unit of data requested. The unit of data is then transmitted to the ROB, or other functional units as needed.

Thus, in the event of a load from a WT memory type, execution proceeds along steps 304, 306, and 308 or steps 304, 310, 312, and 314. Importantly, no determination of whether the uOP is speculative or non-speculative is required for processing loads to WT memory. In other words, no distinction in process flow is required between speculative or non-speculative load uOP's to WT memory. Hence, a purely speculative load uOP to WT memory is fully processed by DCU 132 even though the uOP is speculative and therefore may be based upon a mis-predicted branch. If the uOP is speculative, the results of the memory access performed by the DCU are held within the ROB pending retirement of the uOP. If the uOP is non-speculative, then the results of the uOP are not held pending retirement but are dispatched immediately to any functional units requiring the data, as identified by the PDST value.

Thus, the DCU performs loads from WT memory types speculatively. Since loads to WT memory types are performed speculatively, memory mapped I/O should not be identified as WT memory. (A load to the memory mapped I/O may have side effects which may be highly detrimental if the uOP is based upon a mis-predicted branch and subsequently squashed).

It should also be noted that any cache lines retrieved based upon a speculative, and subsequently squashed, uOP are nevertheless valid cache lines. Thus, although the cache line may have been read from memory based on a speculative uOP that is subsequently squashed, the data is nevertheless valid and is retained within the DCU for use in satisfying subsequent uOP's.

If the uOP is a store uOP rather than a load uOP, then execution proceeds from step 302 to step 303 where, if the uOP is speculative, further processing is deferred until after retirement of the uOP. If the uOP is not speculative, or if the uOP is speculative and has retired, execution proceeds to step 316 where the DCU is accessed. If a DCU hit occurs, execution proceeds through step 318 to step 320 where the cache line identified by the DCU hit is updated with data contained within the uOP store uOP.

At 322, the store is transmitted to external memory using a partial write operation.

Thus, the actual store to external memory for a WT memory type is deferred until the uOP is known to be non-speculative. If the uOP was originally non-speculative, the process of steps 316-322 corresponds to a typical write-through cache protocol wherein a cache line is updated and a partial write is immediately transmitted to external memory. Processing of the uOP is only deferred if the uOP is speculative. If non-speculative, processing of the uOP, including accessing the DCU, is performed without deferral.

In the event that a DCU miss occurs as a result of a uOP store operation, execution proceeds from 316 through step 328 to step 330 at which time the uOP store operation is transmitted to external memory using a partial write. Hence, the process of steps 328-330 correspond to typical write-through processing for non-speculative uOP's. If the uOP is speculative, processing of the uOP including accessing the DCU is deferred until the uOP is known to be non-speculative. If the uOP never retires because, for example, the uOP was based upon a mis-predicted branch, then no partial write is transmitted to external memory based upon the uOP. Thus, the store uOP processing of steps 318-322 and 328-330 are only performed if the uOP retires.

Thus, FIG. 7 illustrates a method of processing memory uOP's to memory locations identified as WT memory locations. Whether a particular memory location is identified as WT or some other memory type is provided by the programmer. Preferably, only memory locations which would otherwise be subject to conventional write-through cache protocol are identified as being of the WT memory type. Although described primarily with reference to an out-of-order microprocessor, advantages of the write-through processing of the invention are also gained in in-order microprocessors.

Write-Back Memory Type Processing

Figure 8:
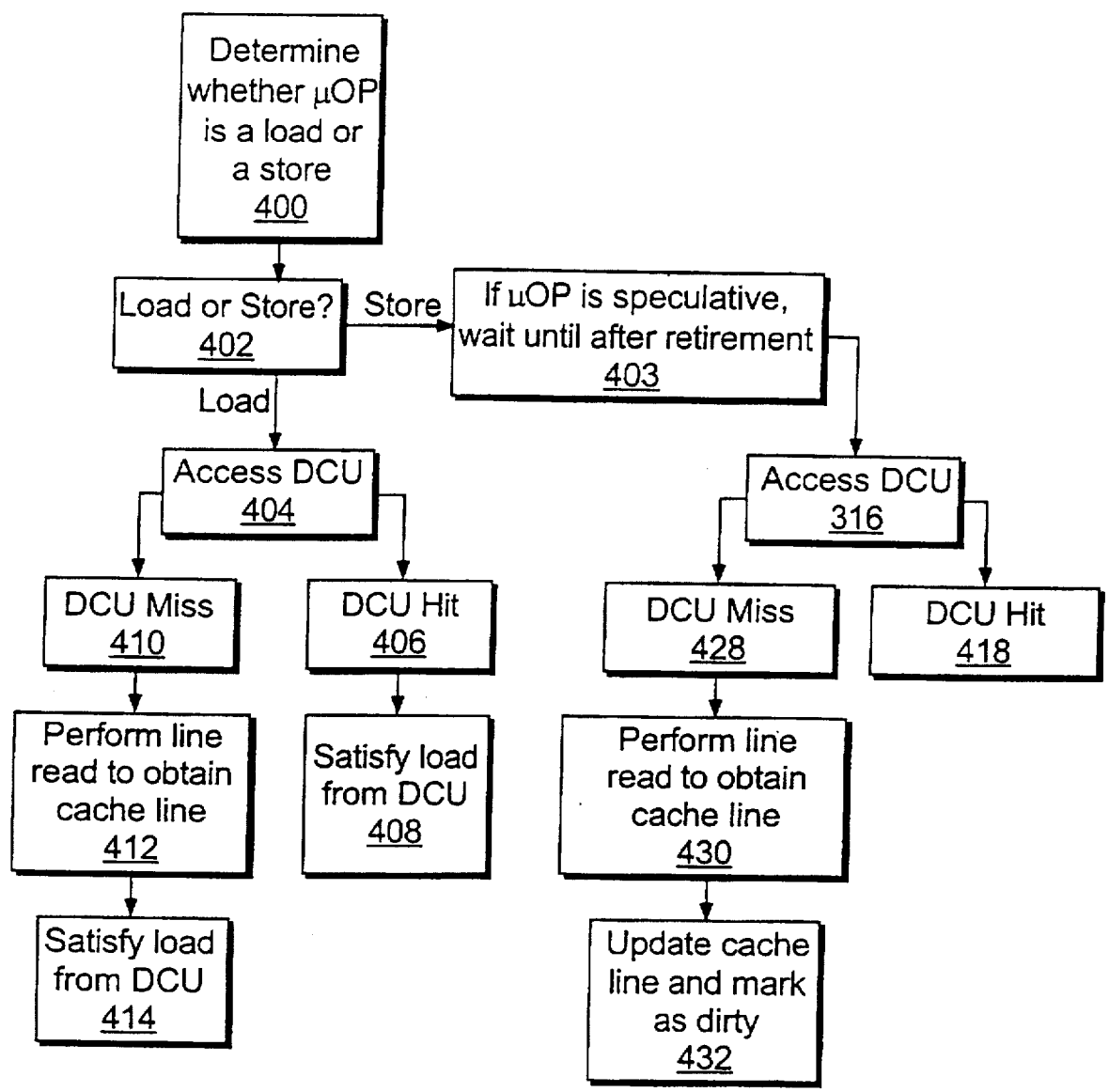
FIG. 8 is a flow chart illustrating a method by which memory instructions identifying write-back memory types are processed by the microprocessor of FIG. 4.

FIG. 8 illustrates a method by which memory uOP's identifying a memory location of the WB memory type are processed.

At step 400, a determination is made whether the uOP is a load or a store. If the uOP is a load, execution proceeds through step 402 to step 404 where DCU 132 is accessed in an attempt to satisfy the load. If a DCU hit occurs, execution proceeds through step 406 to step 408 where the load is satisfied directly from the cache line identified by the DCU hit of step 406. If a DCU miss occurs, execution proceeds from step 404 through step 410 to step 412 where a line read is performed to obtain a cache line containing the data subject to the load operation. The uOP load is then satisfied from the cache line, once the cache line has been placed in the DCU, at step 414. As with the load processing steps of the WT memory type set forth above in FIG. 7, the load processing steps of the WB memory type are performed independent of whether the uOP is speculative or non-speculative. As such, memory mapped I/O should not be designated as WB memory type since loads may be performed speculatively to WB memory locations based upon mis-predicted branches and such load could have unintended side-effects, if applied to memory mapped I/O.

If the uOP is a store, execution proceeds from step 402 to step 403 where, if the uOP is speculative, further processing of the uOP is deferred until retirement. If the uOP is not speculative or if the uOP is speculative and has retired execution proceeds to step 416 where the DCU is accessed. If a DCU hit occurs, execution proceeds through step 418 to step 420 where the cache line identified by the DCU hit is updated to include the data provided in the uOP store operation and the line is marked as dirty. Ultimately, the updated cache line may be evicted, preferably by a burst mode eviction.

The steps for processing a store uOP to a WB memory type are performed only if the uOP is non-speculative or, if speculative, only after the uOP retires.

If, at step 416, a DCU miss occurs, then execution proceeds through step 428 to step 430 where a read-for-ownership is performed to obtain an entire cache line from external memory containing the memory location subject to the uOP store operation. At 432, the cache line subject to the previous line read operation is updated to reflect the uOP store operation. At step 432, the line is also marked as dirty. Sometime thereafter, the updated cache line is evicted using a burst mode eviction.

Thus, for a DCU miss based on a non-speculative uOP store operation to write-back memory, a read-for-ownership is performed to obtain a cache line, the cache line then is updated to reflect the store data, and, finally, the cache line is written-back to external memory. The foregoing three steps represent a true write-allocate with read-for-ownership operation. A true write-allocate may be performed without the risk of affecting memory mapped I/O because the memory type is known prior to initiating the write-allocate operation.

If the uOP is speculative, the entire write-allocate operation including DCU access, is deferred until the uOP has retired. Although a delay may occur pending the retirement of the uOP, the overall processing steps also represent a true write-allocate operation.

Thus, FIG. 8 illustrates steps from processing write-back memory types in accordance with the invention where the memory type is known prior to accessing the DCU. One important aspect of the method of FIG. 8 is that DCU misses are performed speculatively. Another important aspect is that a true write-allocate is performed to satisfy a DCU miss of a store uOP to write-back memory. Although described primarily with reference to an out-of-order microprocessor, advantages of the write-back processing of the invention are also gained in in-order microprocessors.

Write-Protect Memory Processing

Figure 9:
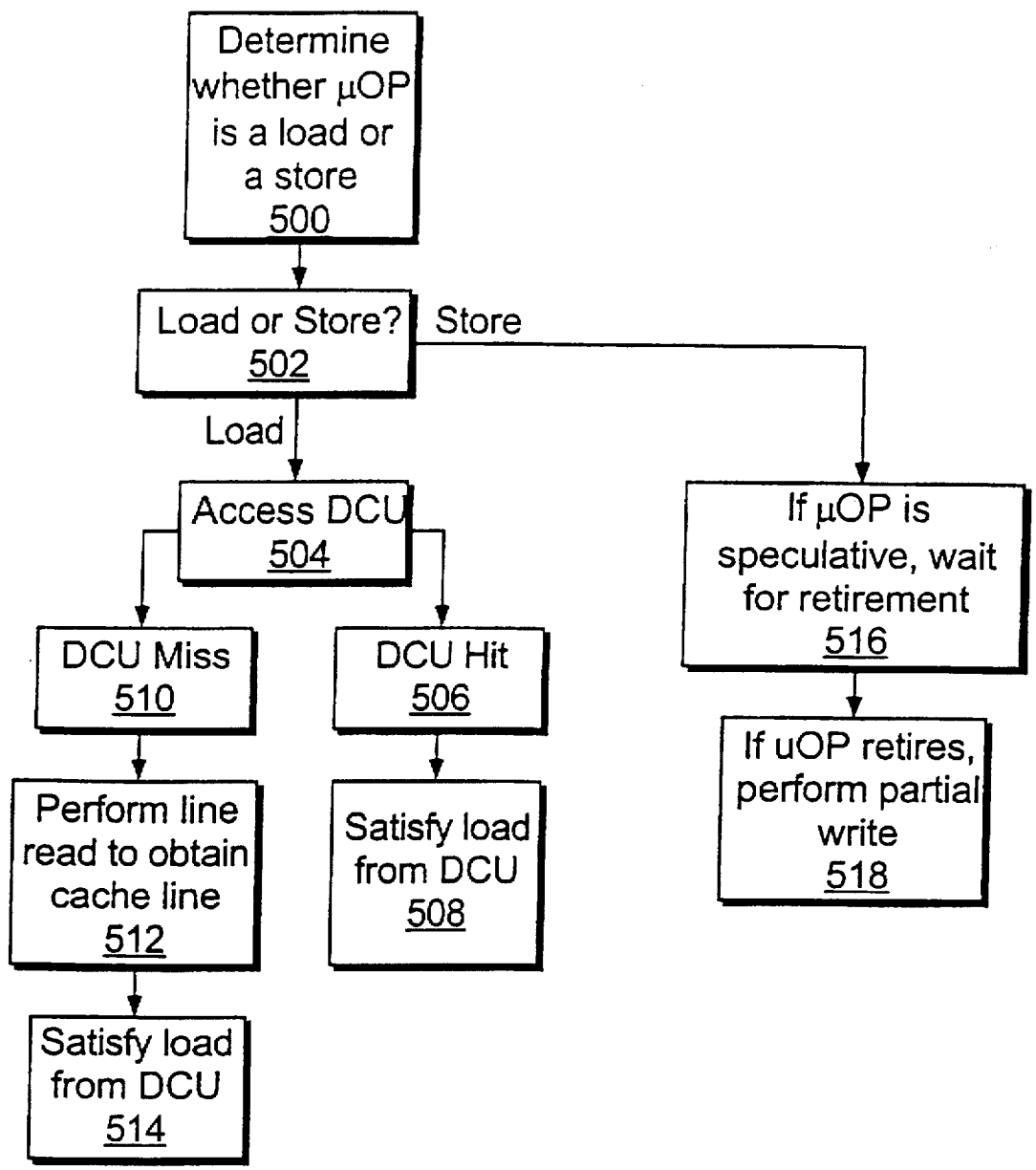
FIG. 9 is a flow chart illustrating a method by which memory instructions identifying write-protect memory types are processed by the microprocessor of FIG. 4.

FIG. 9 illustrates a method by which memory uOP's to write-protect memory are processed. Initially, at step 500, a determination is made as to whether the uOP is a load or store operation. If the uOP is a load, execution proceeds through step 502 through step 504 where a DCU is accessed. If a DCU hit occurs execution proceeds through step 506 to step 508 where the load operation is satisfied from the cache line identified by the DCU hit of step 506. If a DCU miss occurs, execution proceeds from step 504 through step 510 to step 512 where a line read is performed to obtain a cache line containing the data subject to the load uOP. Next, at step 514, the load operation is satisfied from the cache line retrieved at step 512.

Hence, the load processing steps for a uOP identifying a write-protect memory type are similar to those of the write-back and write-through memory types. As with the write-back and write-through memory types, load operations are performed speculatively. Data can be safely loaded from memory based on a speculative uOP since the memory type is known in advance. As with the write-through and write-back memory types, it is best that memory mapped I/O not be identified as write-protect memory, since speculative load operations dispatched during write-protect processing to external memory could otherwise cause unintended side effects.

The processing of a store operation of to write-protected memory, however, differs substantially from that of write-back and write-through memory. For a store uOP to a write-protected memory type, no DCU access is performed, rather, execution proceeds directly from step 502 to step 516 where, if the uOP is speculative, further processing is deferred until retirement of the uOP. If the speculative uOP subsequently retires or if the uOP is not speculative, a partial write operation is performed at step 518.

Figure 1:
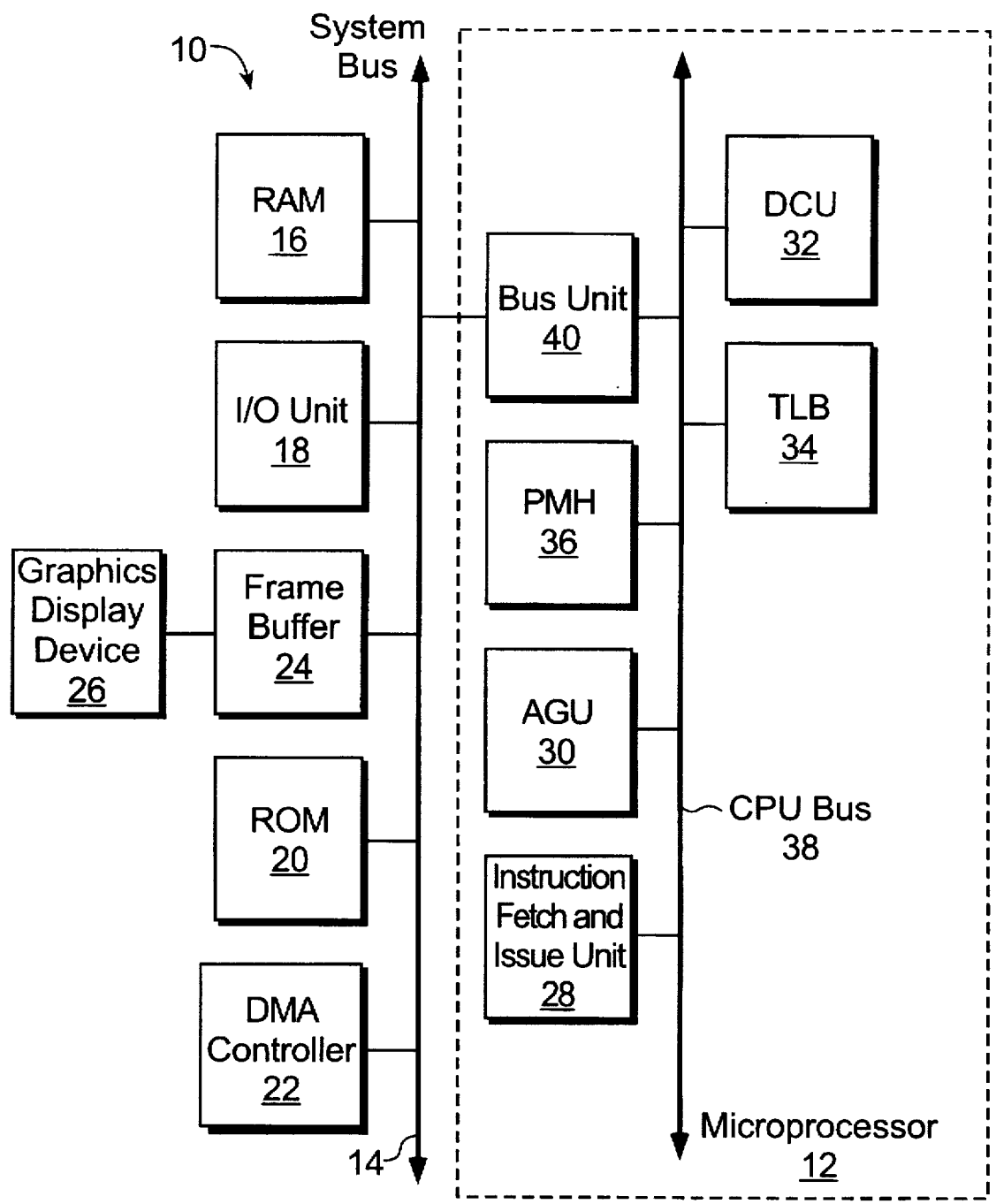
FIG. 1 is a block diagram illustrating an exemplary prior art computer system.
Figure 2:
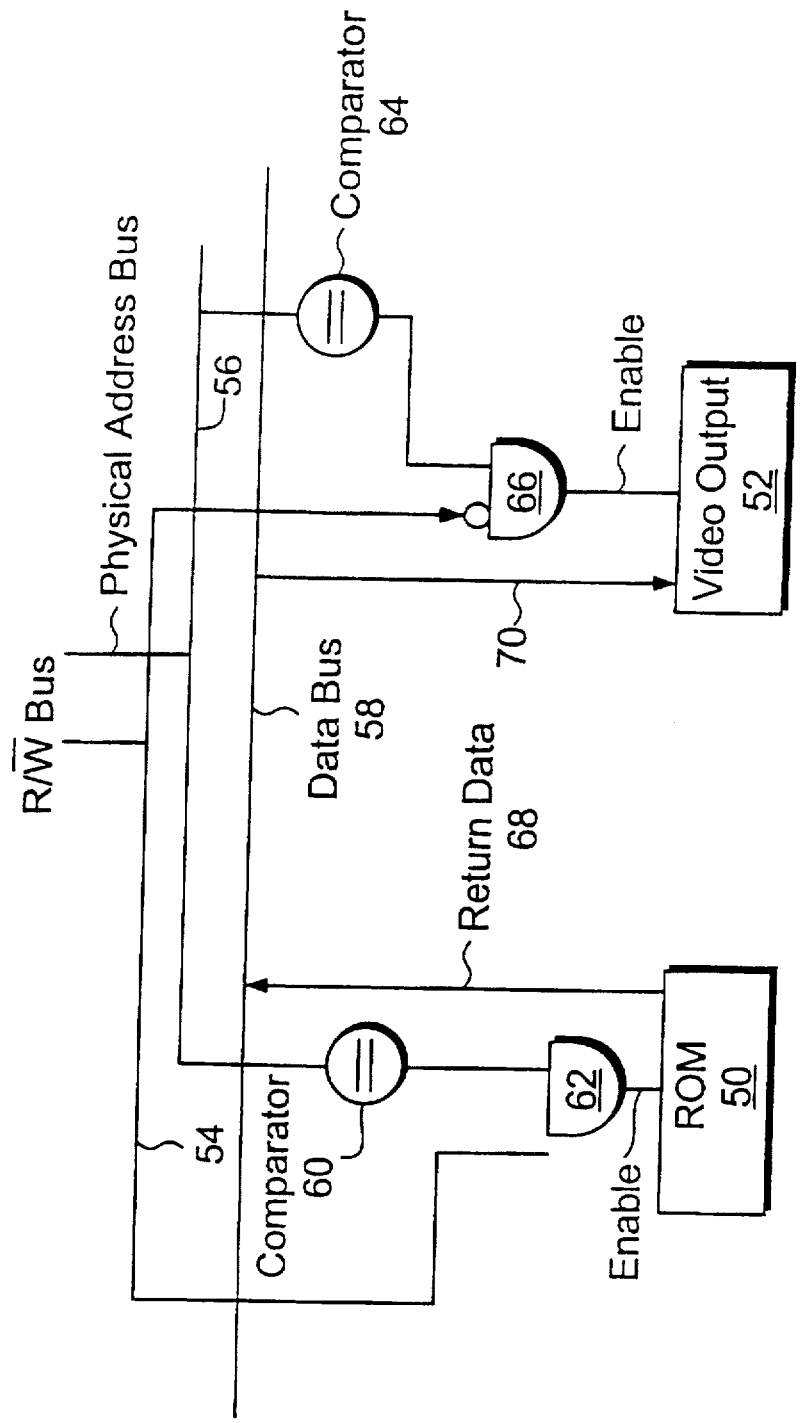
FIG. 2 is a block diagram illustrating a ROM and a video output device configured in accordance with prior art to address a single physical address space.

Since the DCU is not accessed to satisfy a store uOP to a WP memory location, any cache line within the DCU containing data from the memory location is unaffected by the store uOP. In other words, the DCU simply ignores store uOP's to memory locations identified as write-protect. Nevertheless, a partial write is transmitted to external memory. Such is provided to allow a memory device placed "behind the ROM" to be properly updated by a write operation. Thus, in circumstances described above with reference to FIG. 2 wherein an output device shares a physical address space with a ROM, write operations into the physical address space of the ROM are dispatched from the microprocessor, thereby allowing the write operations to be properly executed by the output device sharing the physical address space of the ROM.

Thus, the provision of the write-protect memory type allows ROM data to be cached while also allowing output devices placed behind the ROM to properly receive partial writes. Again, although the exemplary embodiment described herein is a microprocessor of issuing speculative uOP's, advantages of the invention are also gained in in-order microprocessors. In particular, ROM data is rendered cacheable while still allowing memory devices to be placed behind the ROM.

Restricted-Cacheability Memory Type Processing

Figure 10:
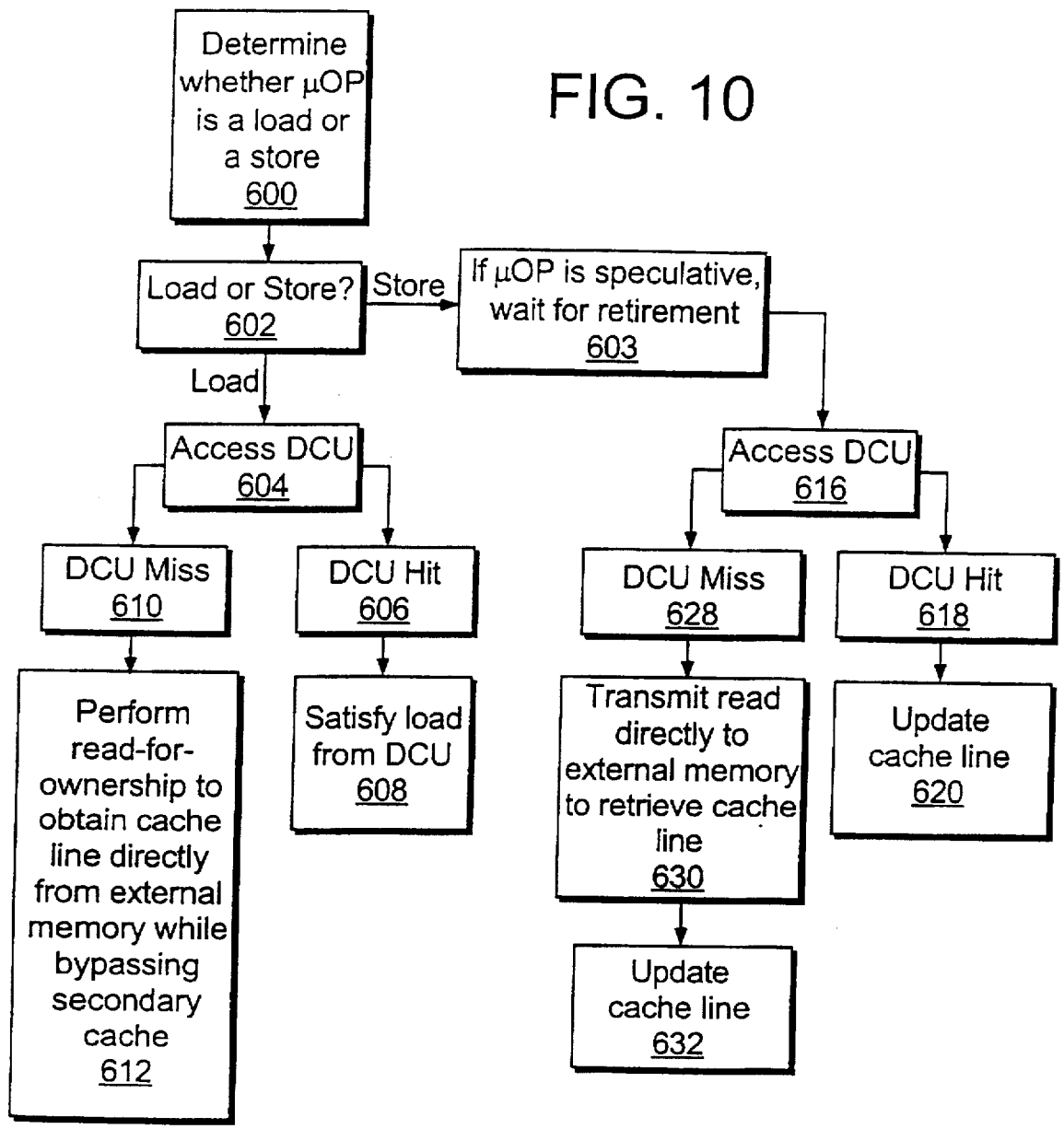
FIG. 10 is a flow chart illustrating a method by which memory instructions identifying restricted-cacheability memory types are processed by the microprocessor of FIG. 4.

FIG. 10 illustrates a method by which a memory uOP identifying an RC memory location is processed. As noted above, the RC memory type is employed for identifying memory locations which are subject to caching within the DCU but not within a secondary external cache such as cache 119. The steps by which memory uOP's to RC memory are processed are similar to those of write-back processing and details of such processing steps will not be redescribed. Rather, only pertinent differences will be described in detail.

FIG. 10 illustrates method steps 600–632 which are generally in accordance with method steps of FIG. 8. However, at step 612, where a line read is performed to obtain a cache line to satisfy a DCU load miss, the line read bypasses the secondary cache. Where a write-back of a cache line to external memory occurs as a result of a DCU hit based on a store uOP, the write back also bypasses secondary cache 119. Likewise, at step 630, where a line read is performed in response to a DCU miss of a store uOP, the line read bypasses secondary cache.

Thus, in each circumstance where external memory is accessed either for a load or for a store, secondary cache 119 is bypassed.

Other aspects of the processing of the memory uOP's to RC memory are similar to that of WP memory. In particular, a true write-allocate operation is performed in response to a store miss. Also, load misses are performed speculatively. If desired, the RC memory processing protocol can be defined such that DCU 132 is bypassed and all data is cached only within secondary cache 119. For systems employing two or three levels of caches, additional distinctions can be made between whether or how data is cached within various caches. For systems employing separate data cache units and instruction cache units, similar distinctions may be made as well.

Uncacheable Speculatable Write-Combining Memory Type Processing

Figure 11:
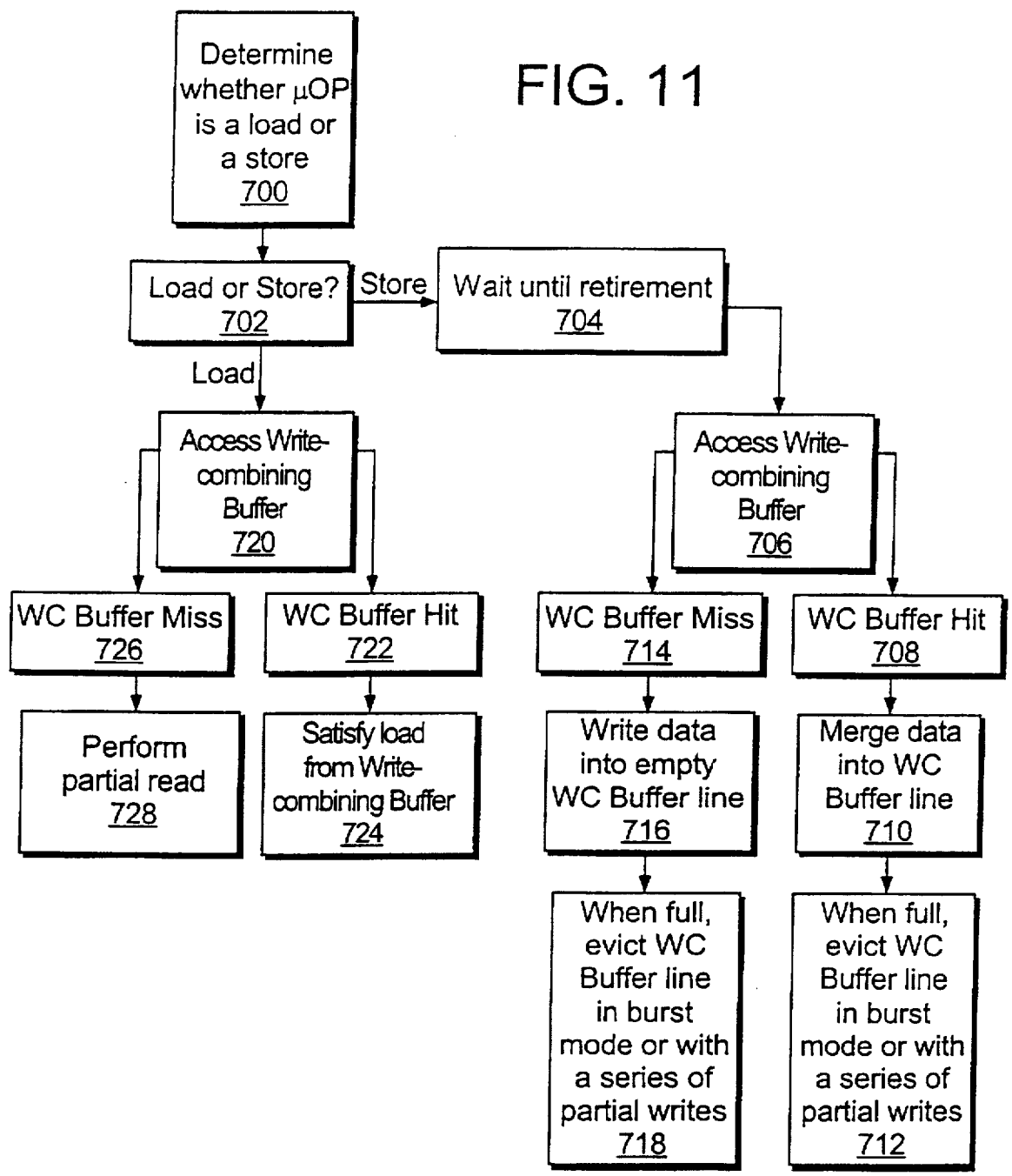
FIG. 11 is a flow chart illustrating a method by which memory instructions identifying uncacheable speculatable write-combining memory types are processed by the microprocessor of FIG. 4.

FIG. 11 illustrates the steps by which a memory uOP to the USWC memory type is processed. As noted above, the USWC memory type is employed for memory locations, such as frame-buffer locations, containing uncacheable data which is typically subject to sequential write operations. Other important aspects of USWC memory is that processor ordering is ignored, and global observability is not required.

Initially at step 700, a determination is made of whether the uOP is a load or a store operation. If the uOP is a store, execution proceeds through step 702 to step 704 where further execution is deferred until retirement. Hence, execution of store operations to USWC memory types are not performed speculatively, but are always deferred until retirement. After the uOP is no longer speculative, a write-combining buffer (not shown), provided within DCU 132, is accessed. As noted above, the write-combining buffer is a fill buffer of the nonblocking DCU which is employed to store uncacheable data. Details of the write-combining buffers and the manner by which the write-combining buffers are accessed are provided in the above referenced patent application entitled "Method and Apparatus for Combining Uncacheable Write Data into Cache-line-sized Write Buffers". As the co-pending application is incorporated by reference herein, details of the structure and function of the write-combining buffers will not be described in detail herein. Rather, only the pertinent process flow steps relating to the write combining buffers will be described. At step 706, when a hit occurs within one of the write-combining buffers, execution proceeds through step 708 to step 710 where the write-combining buffer line, found at step 708, is updated. Such is performed generally in accordance with a DCU cache line update.

At step 712, once the WC buffer line is full, the WC buffer is evicted in burst mode or with a series of partial write operations, each of which may also be a burst mode write. Eviction of the WC buffer line may also occur before the buffer is full, as a result of a synchronization fence, or other triggering operation. Again, details of the method by which a WC buffer line is evicted are provided in the above-referenced co-pending patent application.

Thus, steps 704–712 illustrate a method by which an individual write operation to a USWC memory location is handled. As noted, processing of the store operation is deferred until the retirement of the uOP, then the store is merged with other stores within a WC buffer line prior to eventual burst mode eviction once the WC buffer is full or after a synchronization fence, interrupt, or similar trigger occurs. By merging several store operations to USWC memory within a single WC buffer line, cache-line-based burst processing techniques may be employed to expedite transmission of the uncacheable USWC write. Because writes are merged, then evicted together, processor ordering is not necessarily preserved. Hence, the USWC memory type should not be used for memory locations which require strong processor ordering. Since processor ordering is ignored, global observability, which is otherwise required to help preserve processor ordering, need not be established. Accordingly, transmission delays, ordinarily placed between partial write operations to frame buffers, to allow for global observability, are not provided.

If, at step 706, a miss occurred within the WC buffer, execution proceeds through step 714 to step 716 where data identified by the stored uOP is stored within an empty WC buffer line. If no WC buffer lines are empty, one is evicted, then the store data is placed within the newly available WC buffer line. At 718, once the WC buffer line is full, the line is evicted using burst mode. As with step 712, a WC buffer line may be evicted before the buffer is full upon, for example, the occurrence of a synchronization fence or interrupt. In such a circumstance, the WC buffer line is evicted using a sequence of burst writes, a sequence of partial writes, or a combination of the two. Also, as with step 712, step 718 is performed in a manner which ignores processor ordering and which ignores global observability. Also, it should be noted that within a multiprocessor system it is not necessary for processors to snoop the write-combining buffer lines of other processors, as may be required with DCU cache lines. Such snooping is sometimes employed for cacheable data to ensure processor ordering. However, since processor ordering is ignored for USWC memory, such snooping is not needed.

Although the USWC memory type is primarily employed for memory subject to write operations, such as frame buffer memory, load operations may also occur from USWC memory. For a load operation, execution proceeds from step 702 to step 720 where the write-combining buffers are accessed in an attempt to satisfy the load. If a hit occurs to the WC buffers, execution proceeds through step 722 to step 724 where the load is satisfied from the WC buffer. If a miss occurs within the WC buffers, execution proceeds from step 720 through step 726 to step 728 where a partial read is performed to retrieve the data subject to the load.

As noted, interrupt operations also trigger eviction of WC buffer lines. Preferably, at least one interrupt is generated every thirtieth of a second, such that the WC buffer lines are evicted at least as frequently as data is displayed on a conventional CRT display, i.e., at thirty frames per second. By providing such interrupts, prompt output of graphics write operations is ensured.

Although described primarily with reference to an out-of-order microprocessor advantages of the USWC memory type may be achieved in in-order processors as well. With an in-order processor, merging of USWC write operations need not be delayed until retirement. In its various implementations, the provision of the USWC memory type, in combination with the write-combining buffers, allows for a substantial reduction in the bus traffic. Individual graphic write operations, which would otherwise be transmitted as individual partial writes, are efficiently merged into cache line sized units then transmitted in burst mode. In state of the art microprocessors, graphics display speed is critical and the reduction in graphics bus traffic represents a significant advantage.

Uncacheable Type Memory Processing

Figure 12:
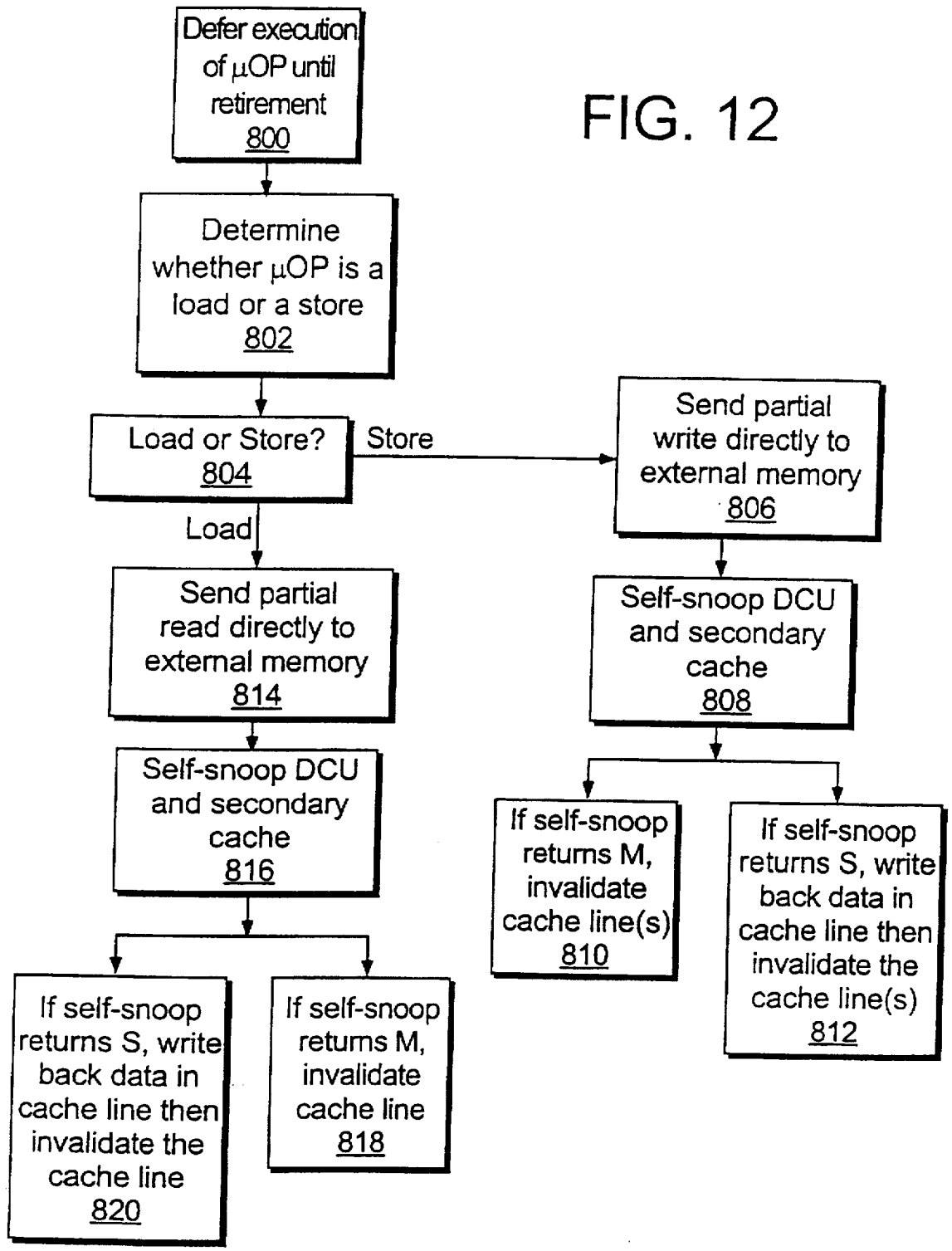
FIG. 12 is a flow chart illustrating a method by which memory instructions identifying uncacheable memory types are processed by the microprocessor of FIG. 4.

FIG. 12 illustrates a method by which memory uOP's to UC memory are processed. As noted above, UC memory is uncacheable memory, which is neither subject to caching within the DCU cache lines or within the write combining buffer lines. UC memory includes, for example, memory mapped I/O. UC memory is not subject to either speculative loads or speculative stores.

Initially, at step 800, execution of the uOP is deferred until retirement. After retirement, execution proceeds to step 802, where a determination is made as to whether the uOP is a load or store. If the uOP is a store, execution proceeds through step 804, to step 806 where a partial write is transmitted to external memory. At step 806, the DCU is bypassed, since it is known that the data is uncacheable.

The partial write of step 806 is sufficient to update the external memory in response to the store uOP. Although memory of the UC memory type is uncacheable and therefore should not be stored within the DCU, cache lines may nevertheless exist within the DCU which include UC data. Such may occur as an artifact of the distinction between physical addresses and linear addresses and in particular as a result of the possibility that two linear addresses may correspond to a common physical address.

Since cache lines may exist which include data from the memory location updated by the uOP store operation, the DCU self-snoops to detect such cache lines and invalidates cache lines as needed. More specifically, at step 808, the DCU and (any secondary cache) self-snoops its own cache lines to identify the cache lines containing the physical address identified by the stored uOP. If the self-snoop identifies a cache line which has been modified (i.e. a cache line in the "M" state) the cache line is written back to external memory. If the self-snoop detects a cache line which is in the shared state, the cache line is invalidated. Hence, any cache line containing the uncacheable data subject to the store uOP is invalidated.

If, at step 804, the uOP is a load, execution proceeds to step 814 where a partial read is transmitted to external memory to satisfy the load uOP. Again, the DCU is bypassed, since the data is known to be uncacheable. However, as with the uOP store operations, there are circumstances where the DCU may nevertheless contain a cache line storing uncacheable data corresponding to the memory uOP. Accordingly, self-snooping steps 816, 818 and 820 are performed. Steps 816 and 820 are similar to steps 808–812.

Thus, for data which is known to be uncacheable, execution is deferred until retirement, then partial reads or writes are dispatched to external memory. Since external loads are deferred until retirement, no undesirable side-effects may result from loading data from memory mapped I/O as can result from speculative load operations.

Hence, FIGS. 7–12 illustrate specific methods for processing memory uOP's to memory of each of the six memory types. In the following section, a method by which MOB 142 allocates and reorders load and store uOP's will be described.

Memory Processing within Memory Ordering Buffer

When designing an out-of-order microprocessor, choices are made as to how memory uOP's are reordered. The extent to which the original or natural ordering of the uOP's is preserved is generally referred to as "strong ordering" or "weak ordering". For example, in a strongly ordered system, no memory uOP's are allowed to pass other memory uOP's. As such, a strongly-ordered microprocessor is an in-order microprocessor. The microprocessor of the present invention adopts weak ordering wherein certain uOP's are allowed to pass other uOP's while others are not.

In general, the present invention adopts a memory ordering scheme wherein loads are allowed to pass other loads, but loads are not allowed to pass stores, and stores are not allowed to pass other stores. More precisely, loads are allowed to pass other loads, except a load to a UC memory type is not allowed to pass other loads. As noted above, all potentially memory mapped I/O locations are identified as UC memory.

Figure 13:
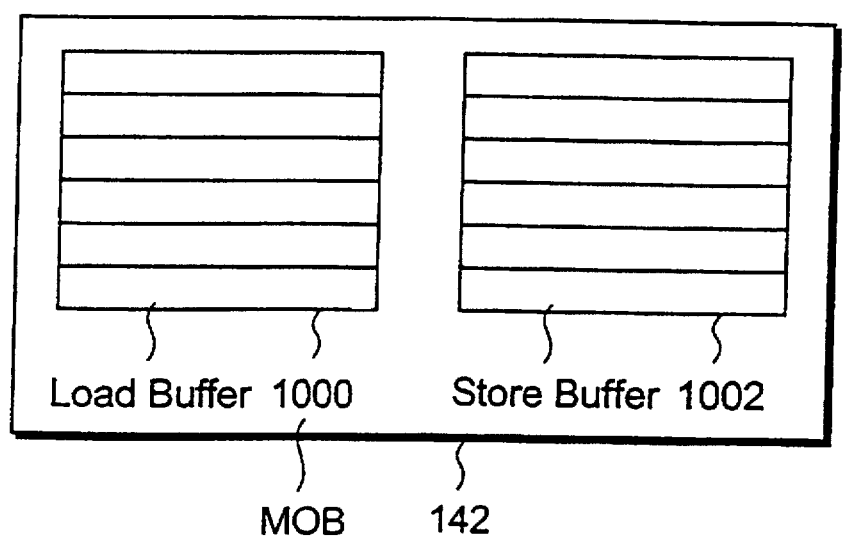
FIG. 13 is a block diagram of the memory-ordering buffer of FIG. 4.

FIG. 13 illustrates MOB 142 to facilitate the reordering of memory instructions, the MOB is provided with a load buffer 1000 and a store buffer 1002. At step 208, (FIG. 6) newly received uOP's are allocated within the MOB by placing the uOP's within either load buffer 1000 or store buffer 1002. As noted above, a determination of whether a uOP provides a load or a store location is determined from the OPCODE or another value within the uOP. The OPCODE also provides an indication of the original sequential order of the uOP's. This is achieved by storing a value in the PDST field (FIG. 5) which provides an indication of the relative age of the uOP. Hence, a determination can be made as to whether one uOP is older or younger than another uOP. After allocation within either load buffer 1000 or store buffer 1002, the MOB selectively reorders the uOP's in accordance with the above-noted ordering constraints. Details by which the MOB reorders uOP's are provided in the above-cross-referenced patent application describing the MOB. In addition to reordering uOP's, the MOB blocks execution of any uOP's which cannot be executed prior to the resolution of antecedent conditions. For example, a uOP to an unknown memory type should not be executed until the memory type is known or until the uOP retires, since the uOP could address memory mapped I/O. Accordingly, such a uOP is blocked until either retirement or until the memory type is determined to be non-UC memory.

One aspect of the invention is that the MOB reorders loads which are known to be non-UC memory types with respect to other loads. However, the MOB does not reorder loads of unknown memory type or loads to UC memory type with respect to other loads of either unknown memory type or UC memory type. This "weakly ordered" memory ordering protocol is provided, in part, to allow most loads to pass other loads, while also preventing any undesirable side-effects from occurring as a result of a load to a memory mapped I/O passing a previous load.

Another aspect of the memory ordering protocol of the invention is that input and output operations are not allowed to be reordered. In other words loads or stores may not be advanced before any input or output operations. Input and output operations are analogous to store operations since store operations are not reordered either. To ensure that input and output operations are not reordered, input and output uOP's are both allocated within store buffer 1002. Thus, although an input operation actually corresponds to a load operation, the MOB treats an input operation as if it were a store operation by placing the input uOP into the store buffer and then treating the input uOP as if it were a store uOP for purposes of memory ordering protocol.

Figure 14:
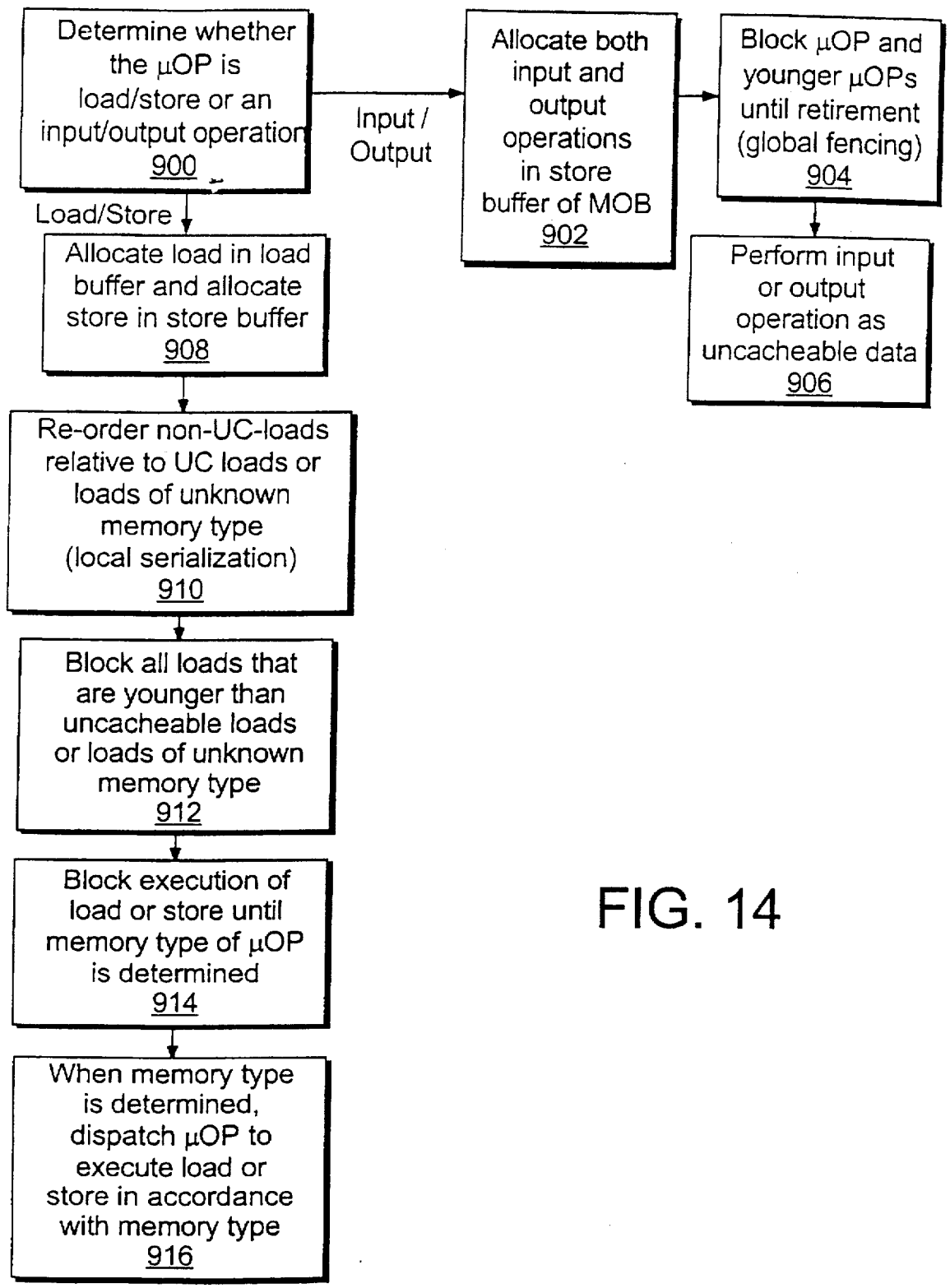
FIG. 14 is a flow chart illustrating a method by which the memory ordering buffer of FIG. 13 processes memory instructions.

FIG. 14 illustrates how I/O and memory operations are handled in the MOB. Initially, at step 900, a determination is made of whether the uOP received by MOB 142 corresponds to a load/store or an input/output operation. The determination is made from the OPCODE of the uOP. All input/output operations are uncacheable operations and hence carry the UC memory type. Thus, for input/output operations, a TLB access or a PMH page table walk need not be performed to determine the memory type. Rather, the memory type is determined merely from an examination of the OPCODE of the uOP.

If the uOP is an input or output operation, execution proceeds to step 902, where MOB 142 allocates the input or output operation in a store buffer of the MOB. Thus, although an input operation is generally characterized as a load operation, MOB 142 actually allocates the input operation within the store buffer within the MOB rather within the load buffer. Thereafter, at step 904, MOB 142 operates to block execution of the input or output uOP and any subsequent load uOP's until retirement of the input/output uOP. After retirement, at step 906, the input or output operation is dispatched for processing in accordance with the UC memory type processing of FIG. 12. Steps 904 and 906 are also herein referred to as "global fencing" operations.

If, at step 900, the uOP is determined to be a load or a store operation, execution proceeds to step 908, wherein the uOP is allocated within MOB 142. If the uOP is a load, the uOP is allocated within the load buffer. If the uOP is a store, the uOP is allocated within the store buffer. Since the uOP is a load or a store, and not an input/output operation, the memory type cannot be determined solely from the OPCODE. Hence, optimal ordering of the load or store with reference to other load or stores cannot be performed until the memory type is determined. As noted above, within the speculative processing protocol of microprocessor 102, load operations are allowed to pass other load operations. However, load operations are not allowed to pass store operations. Furthermore, load operations to UC memory are not allowed to pass loads to non-UC memory. Accordingly, loads are reordered in relation to other loads depending upon whether the memory type is known and depending upon whether the memory type is UC. More specifically, at step 910, non-UC loads are reordered relative to UC loads and to loads of unknown memory types. At 912 all loads are blocked which are younger than any uncacheable loads. At 914, actual execution of any load or store is blocked until the memory type of the load or store uOP is determined. Next, at 916, once the memory type of the load or store uOP is determined, the uOP is dispatched to DCU, to the write-combining buffer, or directly to external memory in accordance to the memory type.

Steps 908–916 are referred to herein as "locally serializing" steps wherein non-UC types loads are allowed to pass other loads but where UC loads are not reordered. Local serializing is employed to prevent side effects which would occur if a load to a UC memory location were allowed to pass other loads.

Conclusion

What has been described is a method and apparatus for processing memory uOP's within a microprocessor wherein, among other things, a memory type value is explicitly stored within the microprocessor to allow the memory type of the memory location to be known in advance. In the exemplary implementation described herein, the microprocessor is an out-of-order microprocessor capable of dispatching speculative memory uOP's. However, principles of the invention may be employed in a variety of microprocessor systems including in-order microprocessors. The microprocessor of the invention may be configured and constructed in accordance with conventional techniques and may be implemented, for example, housing silicon or gallium arsenide technology. The invention is advantageously employed within microprocessor having Intel architecture. However, principles of the invention may also be applied to other general microprocessor architectures and to other computer processors as well. Accordingly the exemplary embodiments described herein are merely illustrative of the invention and should not be taken as limiting the scope of the innovation.

What is claimed is:

1. A computer system comprising:
   an external memory;
   a first cache memory;
   at least one microprocessor coupled to the external memory;
   wherein the at least one microprocessor includes a register to store a memory type value identifying a memory access protocol appropriate for accessing a memory location of the external memory, and a second cache memory to cache the memory type value received from the register, the memory type value indicating a particular memory access protocol from a plurality of memory access protocols to be used by the at least one microprocessor for accessing the memory location; and
   wherein the at least one microprocessor is operative to determine the memory access protocol for the memory location by accessing the second cache and further operative to access information stored in the memory location according to the memory access protocol identified by the memory type value.

2. The computer system of claim 1, wherein said memory type value identifies a write-back cache memory access protocol.

3. The computer system of claim 1, wherein said memory type value identifies a write-through cache memory access protocol.

4. The computer system of claim 1, wherein the memory type value identifies a write-combining memory access protocol.

5. The computer system of claim 1, wherein the register is one of a plurality of registers, and wherein the plurality of registers are to store memory type values identifying memory processing attributes of each memory location of the external memory.

6. The computer system of claim 1, wherein said memory type value identifies a write-protected cache memory access protocol.

7. The computer system of claim 6, wherein the external memory corresponding to the memory type value identifying write-protected cache memory access protocol is a ROM.

8. The computer system of claim 1, wherein said memory type value identifies an uncacheable memory access protocol.

9. The computer system of claim 8, wherein the external memory corresponding to the memory type value identifying uncacheable memory access protocol is a memory mapped I/O memory location.

10. The computer system of claim 1, wherein the at least one microprocessor is capable of generating speculative memory access microinstructions.

11. The computer system of claim 10, wherein said memory type value identifies whether a memory processing instruction for accessing the memory location is speculatable or nonspeculatable.

12. The computer system of claim 10, wherein said memory type value identifies a write-back cacheable speculatable memory access protocol.

13. The computer system of claim 10, wherein said memory type value identifies a write-through cacheable and speculatable memory access protocol.

14. The computer system of claim 10, wherein the memory type value identifies a write-combining speculatable memory access protocol.

15. The computer system of claim 10, wherein said memory type value identifies a write-protected cacheable and speculatable memory access protocol.

16. The computer system of claim 15, wherein the external memory corresponding to the value identifying write-protected cacheable and speculatable memory access protocol is a ROM.

17. The computer system of claim 10, wherein said memory type value identifies an uncacheable nonspeculatable memory access protocol.

18. The computer system of claim 17, wherein the external memory corresponding to the memory type value identifying uncacheable nonspeculatable memory access protocol is a memory mapped I/O memory location.

19. In a computer system having a microprocessor and an external memory, wherein the microprocessor includes a first cache to cache information from said external memory, a register to store memory type values corresponding to locations of the external memory, and a second cache to cache the memory type values, a method for accessing a memory location within said external memory, said method comprising the steps of:

storing a memory type value within the register identifying a memory access protocol appropriate for accessing the memory location;

transferring the memory type value to said second cache;

generating an instruction specifying a memory access to the memory location;

determining the memory access protocol corresponding to the memory location by accessing the memory type value stored in the second cache; and then accessing said memory location according to the memory access protocol identified by the memory type value.

20. The method of claim 19, wherein said memory type value identifies a write-through cache memory access protocol and wherein the step of accessing the memory location comprises the steps of:

determining whether the instruction is a load or a store;

if the instruction is a load, accessing said first cache to determine if a cache hit or a cache miss occurs, and
if a cache hit occurs, satisfying the load from the first cache, and
if a cache miss occurs, performing a line read from said external memory to satisfy said load; and if the instruction is a store, accessing said first cache to determine if a cache hit or a cache miss occurs, and
if a cache hit occurs, updating a cache line within said first cache causing said cache hit with information provided by said instruction, and
if a cache miss occurs, writing information provided by the instruction to external memory.

21. The method of claim 20, wherein said step of writing information provided by the instruction to external memory comprises a partial write operation.

22. The method of claim 20, wherein said instruction is speculative or non-speculative and wherein, if said instruction is a store, such step of accessing said first cache is deferred until said store retires, if at all.

23. The method of claim 19, wherein said memory type value identifies a write-protected cache memory access protocol and wherein the step of accessing the memory location comprises the steps of:

determining whether the instruction is a load or a store;

if the instruction is a load, accessing said first cache to determine if a cache hit or a cache miss occurs, and
if a cache hit occurs, satisfying the load from the first cache, and
if a cache miss occurs, performing a line read from said external memory to satisfy said load; and if the instruction is a store writing information provided by the instruction to external memory.

24. The method of claim 23, wherein said step of writing information provided by the instruction to external memory comprises a partial write operation.

25. The method of claim 23, wherein said instruction is speculative and wherein said step of writing information provided by the instruction to external memory in response to a store is performed only if said speculative instruction retires.

26. In a computer system having a microprocessor, an external memory, a primary cache and a secondary cache to cache information from said external memory, the microprocessor having a register to store memory type values corresponding to locations of the external memory, a method for accessing a memory location within said external memory, said method comprising the steps of:

storing a memory type value within the register identifying a restricted cacheability memory access protocol for accessing the memory location;

generating an instruction specifying a memory access to the memory location;

determining a memory access protocol corresponding to the memory location; and determining whether the instruction is a load or a store;

if the instruction is a load, accessing said primary cache to determine if a cache hit or a cache miss occurs, and
if a cache hit occurs, satisfying the load from the primary cache, and
if a cache miss occurs, performing a line read directly from said external memory while bypassing said secondary cache to satisfy said load; and if the instruction is a store, accessing said primary cache to determine if a cache hit or a cache miss occurs, and
if a cache hit occurs, updating a cache line within said primary cache causing said cache hit with information provided by said instruction, and
if a cache miss occurs, performing a write-allocate operation directly to said external memory while bypassing said secondary cache.

27. The method of claim 26, wherein said write allocate operation comprises the steps of performing a line read from said external memory to read in a cache line containing said memory location, and updating said cache line with information provided by said instruction.

28. The method of claim 26, wherein said instruction is speculative or non-speculative and wherein, if said instruction is a store, such step of accessing said primary cache is deferred until said store retires, if at all.

29. The method of claim 19, wherein said microprocessor includes a write-combining buffer, wherein said memory type value identifies a write-combining memory access protocol and wherein the step of accessing the memory location comprises the steps of:

determining whether the said instruction is a load or a store;

if the said instruction is a load, accessing said write-combining buffer to determine if a hit or a miss occurs, and
if a hit occurs, satisfying the load from the write-combining buffer, and
if a miss occurs, performing a partial read from said external memory to satisfy said load; and if the said instruction is a store, accessing said write-combining buffer to determine if a hit or a miss occurs, and
if a hit occurs, updating a buffer line within said write-combining buffer causing said hit with information provided by said instruction, and
if a miss occurs, writing information provided by said instruction into an empty buffer line within said write-combining buffer.

30. The method of claim 29, wherein said instruction is speculative or non-speculative and wherein said step of accessing said memory location includes the step of:

waiting until said instruction retires before accessing said write-combining buffer for a store operation.

31. The method of claim 29, wherein said step of accessing said memory location includes the further steps of:

for a store operation, evicting said buffer line using a burst mode eviction when the buffer line is full.

32. The method of claim 19, wherein said memory type value identifies a write-back cache memory access protocol and wherein the step of accessing the memory location comprises the steps of:

determining whether the instruction is a load or a store;

if the instruction is a load, accessing said first cache to determine if a cache hit or a cache miss occurs, and
if a cache hit occurs, satisfying the load from the first cache, and
if a cache miss occurs, performing a line read from said external memory to satisfy said load; and if the instruction is a store, accessing said first cache to determine if a cache hit or a cache miss occurs, and if a cache hit occurs, updating a cache line within said first cache causing said cache hit with information provided by said instruction, and if a cache miss occurs, performing a write-allocate operation.

33. The method of claim 32, wherein said write allocate operation comprises the steps of performing a line read from said external memory to read in a cache line containing said memory location, and updating said cache line with information provided by said instruction.

34. The method of claim 32, wherein said instruction is speculative or non-speculative and wherein, if said instruction is a store, such step of accessing said first cache is deferred until said store retires, if at all.

35. The method of claim 34, wherein said write-back of said cache line to external memory is performed using a burst mode eviction.

36. The method of claim 19, wherein said memory type value identifies an uncacheable memory access protocol and wherein the step of accessing the memory location comprises the steps of:

determining whether the said instruction is a load or a store;

if the said instruction is a load, transmitting a partial read operation to external memory while bypassing said first cache; and if the said instruction is a store, transmitting a partial write operation to external memory while bypassing said first cache.

37. The method of claim 36, wherein said instruction is speculative and wherein said step of accessing said memory location includes the step of waiting until said instruction retires before determining whether said instruction is a load or a store and before transmitting a partial read or a partial write operation to said external memory.

38. The method of claim 36, further including the steps of:

self snooping the first cache after transmitting said partial write or said partial read to said external memory; and invalidating any cache line found in the first cache containing information from the memory location identified by the said instruction.

39. The method of claim 38, further comprising the step of writing-back data from said cache line found in the first cache during said self-snoop before invalidating said cache line, if said cache line is in a modified state.

40. A microprocessor for use in a computer system having an external memory, said microprocessor comprising:

a first cache memory to cache information from said external memory;

means for storing memory type values identifying memory access protocols appropriate for accessing corresponding memory locations within the external memory;

a second cache memory to receive the memory type values from the means for storing and to cache the memory type values;

means for generating a memory instruction specifying a memory location within the external memory;

means for determining a memory access protocol corresponding to the memory location by accessing the memory type values stored in the second cache memory; and means for accessing said memory location, after determining the memory access protocol corresponding to the memory location, according to the memory access protocol identified by the memory type values.

41. The microprocessor of claim 40, wherein said means for generating a memory instruction is capable of generating speculative instructions.

42. The microprocessor of claim 41, wherein said means for generating a memory instruction is an out-of-order engine having an instruction fetch and issue unit;

a reservation station; and a reordering buffer.

43. The microprocessor of claim 40, wherein the means for storing memory type values comprises:

memory type range registers relating ranges of external memory locations to corresponding memory type values.

44. The microprocessor of claim 43, wherein said memory type range registers are maintained within a page miss handler.

45. The microprocessor of claim 44, wherein said means for determining the memory access protocol comprises:

means for accessing said memory type range registers during a page table walk.

46. The microprocessor of claim 45, wherein the second cache memory comprises a translation lookaside buffer for caching memory type values for recently accessed memory locations and wherein said means for determining the memory access protocol includes means for accessing said translation lookaside buffer.

47. A computer system comprising:

an external memory;

a cache memory which includes first and second caches;

at least one microprocessor coupled to the external memory, the at least one microprocessor accessing information stored in a memory location of the external memory according to one of a plurality of memory access protocols;

wherein the at least one microprocessor includes a register which stores a memory type value, the memory type value indicating a particular memory access protocol from the plurality of memory access protocols to be used by the at least one microprocessor to access the memory location; and wherein the cache memory includes first and second caches and wherein said memory type value identifies a restricted cacheability memory access protocol wherein information accessed from the memory location can be cached only in the first cache.

48. A computer system comprising:

an external memory;

a cache memory;

at least one microprocessor coupled to the external memory, the at least one microprocessor accessing information stored in a memory location of the external memory according to one of a plurality of memory access protocols, and wherein the at least one microprocessor is capable of generating speculative memory access instructions;

wherein the at least one microprocessor includes a register, separate from the cache memory, which stores a memory type value, the memory type value indicating a particular memory access protocol from the plurality of memory access protocols to be used by the at least one microprocessor for accessing the memory location; and wherein the cache memory includes first and second caches and wherein said memory type value identifies a restricted cacheability nonspeculatable memory access protocol wherein information accessed from the memory location can be cached only in the first cache and only for memory access instructions which are non-speculative.

49. In a computer system having both a microprocessor and external memory, wherein the microprocessor includes a first cache to cache information from the external memory and a second cache to cache memory type values corresponding to locations of the external memory, a method for loading information into the microprocessor from a memory location within said external memory, said method comprising the steps of:

storing memory type values within the microprocessor which identify whether corresponding memory locations contain memory mapped I/O;

transferring the memory type values to the second cache;

generating a memory instruction specifying a memory access to the memory location;

determining a memory type value corresponding to the memory location by accessing the memory type values stored in the second cache;

determining whether the memory instruction specifies a store operation or a load operation;

performing a partial write to said memory location if said memory location is not a memory mapped I/O location and the memory instruction specifies the store operation, and performing a partial read from said memory location if said memory location is a memory mapped I/O location and the memory instruction specifies the load operation.

50. In a computer system having a microprocessor, a first cache, a ROM having storage addresses, and external memory locations some of which share memory addresses with the ROM, a method for accessing a memory location within said external memory, said method comprising the steps of:

storing memory type values in registers within the microprocessor, wherein the memory type values identify whether corresponding memory locations share addresses with the ROM;

transferring the memory type values from the registers to a second cache within the microprocessor;

generating an instruction specifying the memory location;

determining a memory type value corresponding to the memory location specified by the instruction by accessing the memory type values stored in the second cache;

determining whether the instruction specifies a load operation or a store operation; and if the memory location, as determined from the memory type value, shares an address with the ROM, performing a partial write to said memory location, if said instruction is a store operation, and performing a line read from said memory location to load a cache line containing information stored at said memory location into said first cache, if said instruction is a load operation.

51. A microprocessor for use in a computer system having external memory, said microprocessor comprising:

memory type range registers to store a memory type value identifying a memory access protocol appropriate for accessing a memory location within the external memory;

a cache memory to receive the memory type value from the memory type range registers and to cache the memory type value;

an instruction decoder to generate an instruction which specifies the memory location within the external memory;

circuitry, coupled to the instruction decoder, to determine the memory type value corresponding to the memory location specified by the instruction by accessing the cache memory; and circuitry to access said memory location, after the memory type value has been determined, according to the memory processing protocol identified by the memory type value.

52. A computer system having a plurality of microprocessors and an external memory, each of said microprocessors comprising:

a first cache memory to cache information from said external memory;

means for storing memory type values identifying a memory access protocol appropriate for accessing corresponding memory locations within the external memory;

a second cache memory to receive the memory type values from the means for storing and to cache the memory type values;

means for generating an instruction specifying a memory location within the external memory;

means for determining the memory access protocol corresponding to the memory location by accessing the memory type values stored in the second cache memory; and means for accessing said memory location, after determining the memory access protocol corresponding to the memory location, according to the memory processing protocol identified by the memory type value.

* * * * *